US008871540B2

(12) United States Patent
Sato

(10) Patent No.: US 8,871,540 B2
(45) Date of Patent: Oct. 28, 2014

(54) LASER DICING METHOD

(75) Inventor: Shoichi Sato, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/556,618

(22) Filed: Jul. 24, 2012

(65) Prior Publication Data

US 2013/0029444 A1 Jan. 31, 2013

(30) Foreign Application Priority Data

Jul. 27, 2011 (JP) ................................. 2011-164042
Mar. 28, 2012 (JP) ................................. 2012-074937

(51) Int. Cl.
*H01L 33/00* (2010.01)
*B23K 26/08* (2014.01)
*B23K 26/00* (2014.01)

(52) U.S. Cl.
CPC ......... *B23K 26/0042* (2013.01); *B23K 26/0853* (2013.01); *B23K 26/0057* (2013.01)
USPC ................ 438/33; 438/68; 438/113; 438/460

(58) Field of Classification Search
USPC .................................................. 438/33, 113
See application file for complete search history.

(56) References Cited

U.S. PATENT DOCUMENTS

| | | | |
|---|---|---|---|
| 3,985,597 A | 10/1976 | Zielinski | |
| 4,519,872 A | 5/1985 | Anderson | |
| 4,871,896 A | 10/1989 | Kempter et al. | |
| 4,894,115 A | 1/1990 | Eichelberger | |
| 4,970,546 A | 11/1990 | Suzuki | |
| 5,000,811 A | 3/1991 | Campanelli | |
| 5,041,716 A | 8/1991 | Wakabayashi | |
| 5,227,607 A | 7/1993 | Ishiyama | |
| 5,742,634 A | 4/1998 | Rieger et al. | |
| 6,172,325 B1 | 1/2001 | Baird | |
| 6,215,095 B1 | 4/2001 | Partanen | |

(Continued)

FOREIGN PATENT DOCUMENTS

| | | |
|---|---|---|
| CN | 1347176 | 5/2002 |
| CN | 1700444 | 11/2005 |

(Continued)

OTHER PUBLICATIONS

English Abstract of JP 2006-231411 published Sep. 7, 2006 corresponds to JP 3867107.

(Continued)

*Primary Examiner* — Zandra Smith
*Assistant Examiner* — Damian A Hillman
(74) *Attorney, Agent, or Firm* — DLA Piper LLP (US)

(57) ABSTRACT

A laser dicing method includes: placing a workpiece substrate on a stage; generating a clock signal; emitting a pulse laser beam synchronous with the clock signal; switching irradiation and non-irradiation of the workpiece substrate with the pulse laser beam in a unit of light pulse in synchronization with the clock signal to perform first irradiation of the pulse laser beam on a first straight line by controlling the pulse laser beam using a pulse picker; performing second irradiation of the pulse laser beam on a second straight line, which is adjacent to the first straight line in a substantially parallel fashion, after the first irradiation; and forming a crack reaching a workpiece substrate surface on the workpiece substrate by the first irradiation and the second irradiation.

9 Claims, 21 Drawing Sheets

(56) References Cited

U.S. PATENT DOCUMENTS

| | | |
|---|---|---|
| 7,205,501 B2 | 4/2007 | Arai et al. |
| 7,284,396 B2 | 10/2007 | Barron |
| 7,405,137 B2 | 7/2008 | Terayama |
| 7,982,160 B2 | 7/2011 | Baird |
| 8,178,818 B2 | 5/2012 | Baird |
| 8,253,066 B2 | 8/2012 | Gu |
| 8,269,137 B2 | 9/2012 | Ehrmann |
| 2002/0115235 A1 | 8/2002 | Sawada |
| 2002/0149136 A1 | 10/2002 | Baird |
| 2004/0002199 A1 | 1/2004 | Fukuyo |
| 2004/0134894 A1 | 7/2004 | Gu |
| 2005/0067392 A1 | 3/2005 | Nagai et al. |
| 2005/0092720 A1 | 5/2005 | Gu et al. |
| 2005/0181581 A1 | 8/2005 | Fukuyo |
| 2006/0086704 A1 | 4/2006 | Nagai et al. |
| 2006/0091126 A1 | 5/2006 | Baird et al. |
| 2006/0092990 A1 | 5/2006 | Koga et al. |
| 2006/0102601 A1 | 5/2006 | Shirk et al. |
| 2006/0119691 A1 | 6/2006 | Shigematsu |
| 2006/0169677 A1 | 8/2006 | Deshi |
| 2006/0191884 A1 | 8/2006 | Johnson et al. |
| 2006/0223234 A1 | 10/2006 | Terayama |
| 2007/0007627 A1 | 1/2007 | Young |
| 2007/0075063 A1 | 4/2007 | Wilbanks |
| 2007/0170162 A1 | 7/2007 | Haupt |
| 2007/0248136 A1 | 10/2007 | Leonardo |
| 2008/0003708 A1 | 1/2008 | Hoshino |
| 2008/0013163 A1 | 1/2008 | Leonardo |
| 2008/0029491 A1 | 2/2008 | Johnson |
| 2008/0057599 A1* | 3/2008 | Kobashi et al. ............... 438/15 |
| 2008/0179304 A1 | 7/2008 | Osako |
| 2008/0204748 A1 | 8/2008 | Nomaru |
| 2009/0004828 A1 | 1/2009 | Kobayashi |
| 2009/0032510 A1 | 2/2009 | Ando |
| 2009/0032511 A1 | 2/2009 | Adams et al. |
| 2009/0081851 A1 | 3/2009 | Sakamoto |
| 2009/0095722 A1 | 4/2009 | Ehrmann |
| 2009/0153868 A1 | 6/2009 | Sawabe |
| 2009/0184096 A1 | 7/2009 | Karasaki |
| 2009/0191693 A1 | 7/2009 | Iizuka |
| 2009/0197351 A1 | 8/2009 | Morikazu |
| 2009/0242522 A1 | 10/2009 | Baird |
| 2009/0242531 A1 | 10/2009 | Baird |
| 2010/0099239 A1 | 4/2010 | Dunne |
| 2010/0311313 A1 | 12/2010 | Uchiyama |
| 2011/0037149 A1 | 2/2011 | Fukuyo |
| 2011/0095006 A1 | 4/2011 | Hayashi |
| 2011/0174787 A1 | 7/2011 | Ide et al. |
| 2011/0240619 A1 | 10/2011 | Hayashi |
| 2011/0298084 A1 | 12/2011 | Tamemoto |
| 2011/0318877 A1* | 12/2011 | Akiyama ............... 438/113 |
| 2013/0026145 A1 | 1/2013 | Ide et al. |
| 2013/0026153 A1 | 1/2013 | Ide et al. |

FOREIGN PATENT DOCUMENTS

| | | |
|---|---|---|
| CN | 101100018 | 1/2009 |
| JP | 04-135083 | 5/1992 |
| JP | 05-177370 | 7/1993 |
| JP | 10-044139 | 2/1998 |
| JP | 10-305384 | 11/1998 |
| JP | 11-224866 | 8/1999 |
| JP | 2002-103066 | 4/2002 |
| JP | 2002-192367 | 7/2002 |
| JP | 2002-192370 | 7/2002 |
| JP | 2002-273585 | 9/2002 |
| JP | 3408805 | 3/2003 |
| JP | 2003-100653 | 4/2003 |
| JP | 2004-528991 | 9/2004 |
| JP | 2004-351466 | 12/2004 |
| JP | 2005-088068 | 4/2005 |
| JP | 2006-123228 | 5/2006 |
| JP | 2006-159254 | 6/2006 |
| JP | 2006-231411 | 9/2006 |
| JP | 2008-209299 | 9/2006 |
| JP | 3867107 | 10/2006 |
| JP | 2007-048995 | 2/2007 |
| JP | 2007-118011 | 5/2007 |
| JP | 2008-006492 | 1/2008 |
| JP | 2008-098465 | 4/2008 |
| JP | 2008-198905 | 8/2008 |
| JP | 2009-010105 | 1/2009 |
| JP | 2009-123875 | 6/2009 |
| JP | 2009-145292 | 7/2009 |
| JP | 2009-160625 | 7/2009 |
| JP | 2009-182019 | 8/2009 |
| JP | 2009-188203 | 8/2009 |
| JP | 2009-200140 | 9/2009 |
| JP | 2009-214182 | 9/2009 |
| JP | 2009-534850 | 9/2009 |
| JP | 2009-226457 | 10/2009 |
| JP | 2010-000542 | 1/2010 |
| JP | 2010-228007 | 10/2010 |
| JP | 2011-240383 | 1/2011 |
| JP | 2011-091322 | 5/2011 |
| JP | 2012-006039 | 1/2012 |
| JP | 2012-006040 | 1/2012 |
| JP | 2012-028734 | 2/2012 |
| JP | 2012-076093 | 4/2012 |
| JP | 2013-048244 | 3/2013 |
| JP | 2013-091074 | 5/2013 |
| KR | 10-0339057 | 5/2002 |
| KR | 10-0444919 | 8/2004 |
| KR | 10-2006-0042968 | 5/2006 |
| KR | 1020100039690 | 4/2010 |
| KR | 10-2011-0046315 | 5/2011 |
| TW | 200621409 | 7/2006 |
| TW | I260051 | 8/2006 |
| TW | 200944321 | 1/2009 |
| TW | 200924891 | 6/2009 |
| WO | WO 98/22995 | 5/1998 |
| WO | WO 2008/008678 | 1/2008 |
| WO | WO 2008/091447 | 7/2008 |
| WO | WO 2009/039184 | 3/2009 |
| WO | WO 2010/098186 | 9/2010 |
| WO | WO 2010/139841 | 12/2010 |

OTHER PUBLICATIONS

English Abstract of JP 2002-192370 published Jul. 10, 2002 corresponds to JP 3408805.
Midorikawa, Katsumi; Recent Progress of Femtosecond Lasers and Their Applications to Material Processing; Proceedings of Laser Materials Processing Conference; Dec. 1998; pp. 29-38; vol. 45; Japan.
English Translation of JP Patent 3867107 published Oct. 13, 2006.
English Translation of JP Patent 3408805 published Mar. 14, 2003.
English Language Abstract of JP 2009-200140 published Sep. 3, 2009.
English Language Translation of JP 2009-200140 published Sep. 3, 2009.
English Translation of JP 2002-192370 published Jul. 10, 2002 corresponds to JP 3408805.
English Language Translation of 2006-231411 published Sep. 7, 2006 which corresponds to JP 3867107.
Related U.S. Appl. No. 13/556,641.
Korean Office Action issued in KR 10-2010-104013 on Jun. 14, 2012.
English Language Translation of Korean Office Action issued in KR 10-2010-104013 on Jun. 14, 2012.
English Language Abstract of JP 2002-103066 published Apr. 9, 2002.
English Language Translation of JP 2002-103066 published Apr. 9, 2002.
English Language Abstract of JP 4-135083 published May 8, 1992.
English Language Abstract of JP 11-224866 published Aug. 17, 1999.
English Language Translation of JP 11-224866 published Aug. 17, 1999.
English Language Abstract of JP 2003-100653 published Apr. 4, 2003.

(56) References Cited

OTHER PUBLICATIONS

English Language Translation of JP 2003-100653 published Apr. 4, 2003.
Korean Office Action issued in KR 10-2011-60952 on Aug. 2, 2012.
English Language Translation of Korean Office Action issued in KR 10-2011-60952 on Aug. 2, 2012.
Related U.S. Appl. No. 13/556,668 electronically captured on Apr. 12, 2013.
Korean Office Action issued in KR 10-2011-0005848 Sep. 1, 2012.
English Language Translation of Korean Office Action issued in KR 10-2011-0005848 Sep. 1, 2012.
English Language Abstract of JP 05-177370 published Jul. 20, 1993.
English Language Translation of JP 05-177370 published Jul. 20, 1993.
English Language Abstract of KR 20000048927 published Jul. 20, 2000 (later published as KR10-0339057 May 31, 2002.
Japanese Office Action issued in JP 2012-074937 dated Jun. 29, 2012.
English Language Translation of Japanese Office Action issued in JP 2012-074937 dated Jun. 29, 2012.
English Language Abstract of JP 2011-091322 published May 6, 2011.
English Language Translation of JP 2011-091322 published May 6, 2011.
English Language Abstract of JP 2010-228007 published Oct. 14, 2010.
Korean Office Action issued in KR 10-2012-0081623 dated Feb. 11, 2014.
English Language Translation of Korean Office Action issued in KR 10-2012-0081623 dated Feb. 11, 2014.
Japanese Office Action issued in JP 2009-245573 on Mar. 4, 2014.
English Language Translation of Japanese Office Action issued in JP 2009-245573 on Mar. 4, 2014.
English Language Abstract and Translation of JP 2009-534850 published on Sep. 24, 2014.
English Language Abstract and Translation of JP 2009-188203 published Aug. 20, 2009.
English Language Abstract and Translation of JP 2005-088068 published on Apr. 7, 2005.
English Language Abstract and Translation of JP 2004-351466 published on Dec. 16, 2004.
English Language Abstract and Translation of JP 2004-528991 published on Sep. 24, 2004.
English Language Abstract and Translation of JP 10-305384 published on Nov. 17, 1998.
English Language Abstract and Translation of JP 2009-226457 published on Oct. 8, 2009.
English Language Abstract and Translation of JP 2008-098465 published on Apr. 24, 2008.
English Language Abstract and Translation of JP 2008-006492 published Jan. 17, 2008.
Chinese Office Action issued in CN 201110023878.3 on Mar. 20, 2013.
English Language Translation of Chinese Office Action issued in CN 201110023878.3 on Mar. 20, 2013.
Taiwanese Office Action issued in TW 100121039 on Mar. 29, 2013.
English Language Translation of Taiwanese Office Action issued in TW 100121039 on Mar. 29, 2013.
English Language Abstract of JP 10-044139 published Feb. 17, 1998.
English Language Translation of JP 10-044139 published Feb. 17, 1998.
English Language Abstract of KR 1020100039690 published Apr. 16, 2010.
English Language Abstract of JP 2002-192367 published Jul. 10, 2002.
English Language Translation of JP 2002-192367 published Jul. 10, 2002.
U.S. Appl. No. 13/159,192 electronically captured Jul. 19, 2013.
U.S. Appl. No. 12/911,277 electronically captured Jul. 19, 2013
U.S. Appl. No. 13/929,472, filed Jun. 27, 2013.

U.S. Appl. No. 13/936,022, filed Jul. 5, 2013.
English Language Abstract of TW504879 (corresponding to CN 1347176) published Oct. 1, 2002.
English Language Abstract of JP 2011-240383 published Dec. 1, 2011.
English Language Translation of JP 2011-240383 published Dec. 1, 2011.
English Language Abstract of JP 2012-006040 published Dec. 1, 2012.
English Language Translation of JP 2012-006040 published Dec. 1, 2012.
English Language Abstract of JP 2012-006039 published Dec. 1, 2012.
English Language Translation of JP 2012-006039 published Dec. 1, 2012.
English Language Abstract of JP 2013-091074 published May 16, 2013.
English Language Translation of JP 2013-091074 published May 16, 2013.
English Language Abstract of JP 2013-048244 published Jul. 3, 2013.
English Language Translation of JP 2013-048244 published Jul. 3, 2013.
Japanese Office Action issued in JP 2012-147728 on Jul. 16, 2013.
English Language Translation of Japanese Office Action issued in JP 2012-147728 on Jul. 16, 2013.
Taiwanese Office Action issued in TW 099136123 on Aug. 20, 2013.
English Language Translation of Taiwan Office Action issued in TW 099136123 on Aug. 20, 2013.
English Language Abstract of JP 2009-160625 published Jul. 23, 2009.
English Language Translation of JP 2009-160625 published Jul. 23, 2009.
English Language Abstract of TW 2006/21409 published as TW 200621409 published on Jul. 1, 2011 (corresponds to US 2009/0081851).
English Language Abstract of JP 2006-122982 published May 18, 2006 (corresponds to US 2006/0092990).
English Language Translation of JP 2006-122982 published May 18, 2006 (corresponds to US 2006/0092990).
English Language Abstract of TW 200924891 published Jun. 16, 2009 (corresponding to WO 2009/039184).
English Language Abstract of JP-2009-123875 published Jun. 4, 2009.
English Language Translation of JP-2009-123875 published Jun. 4, 2009.
Korean Office Action issued in KR 10-2012-81839 on Aug. 23, 2013.
English Language Translation of Korean Office Action issued in KR 10-2012-81839 on Aug. 23, 2013.
Korean Office Action issued in KR 10-2012-81534 on Aug. 22, 2013.
English Language Translation of Korean Office Action issued in KR 10-2012-81534 on Aug. 22, 2013.
Korean Office Action issued in KR 10-2012-0081623 on Aug. 23, 2013.
English Language Translation of Korean Office Action issued in KR 10-2012-0081623 on Aug. 23, 2013.
English Language Abstract of KR 10-2011-0046315 published May 4, 2011.
U.S. Appl. No. 13/159,192 electronically captured Oct. 24, 2013.
U.S. Appl. No. 12/911,277 electronically captured Oct. 24, 2013.
Japanese Office Action issued in JP 2010-011348 on Aug. 20, 2013.
English Language Translation of Japanese Office Action issued in JP 2010-011348 on Aug. 20, 2013.
English Language Abstract and Translation of JP 10-305384 published Nov. 17, 1998.
English Language Abstract and Translation of JP2009-214182 published Sep. 24, 2009.
Japanese Office Action issued in JP 2009-245573 on Oct. 1, 2013.
English Language Translation of Japanese Office Action issued in JP 2009-245573 on Oct. 1, 2013.
English Language Abstract and Translation of JP 2009-145292 published Jul. 2, 2009.

(56) References Cited

OTHER PUBLICATIONS

English Language Abstract and Translation of JP 2007-118011 published May 17, 2007.
English Language Abstract and Translation of JP 2006-159254 published Jun. 22, 2006.
English Language Abstract and Translation of JP 2008-209299 published Sep. 11, 2008.
English Language Abstract and Translation of JP 2002-273585 published Sep. 25, 2002.
Japanese Office Action issued in JP 2012-192985 on Jan. 7, 2014.
English Language Japanese Office Action issued in JP 2012-192985 on Jan. 7, 2014.
English Language Abstract and Translation of JP 2009-1010105 published on Jan. 15, 2009.
English Language Abstract and Translation of JP 2010-000542 published on Jan. 7, 2010.
English Language Abstract and Translation of JP 2006-123228 published on May 18, 2006.
Japanese Office Action issued in JP 2012-147728 on Feb. 19, 2013.
English Language Translation of Japanese Office Action issued in JP 2012-147728 on Feb. 19, 2013.
English Language Abstract of JP 2012-076093 published Apr. 19, 2012.
English Language Translation of JP 2012-076093 published Apr. 19, 2012.
English Language Abstract of JP 2007-048995 published Feb. 22, 2007.
English Language Translation of JP 2007-048995 published Feb. 22, 2007.
English Language Abstract of JP 2012-028734 published Feb. 9, 2012.
English Language Translation of JP 2012-028734 published Feb. 9, 2012.
U.S. Appl. No. 13/929,472.
U.S. Appl. No. 13/936,022.
Taiwanese Office Action issued in TW100101957 dated Jun. 28, 2013.
English Language Language Translation of Taiwanese Office Action issued in TW100101957 dated Jun. 28, 2013.
Chinese Office Action issued in CN 201210265079.1 on Jul. 16, 2014 with English Language Translation.
Japanese Office Action issued in JP 2012-192985 on Sep. 2, 2014 with English Language Translation.
Japanese Office Action issued in JP 2012-152237 dated Apr. 22, 2014.
English Language Translation of Japanese Office Action issued in JP 2012-152237 dated Apr. 22, 2014.
Taiwanese Office Action issued in TW 101125794 dated May 28, 2014 (with English Language Translation).
Taiwanese Office Action issued in TW 101125650 dated Jun. 11, 2014 (with English Language Translation).
U.S. Appl. No. 13/008,382.
U.S. Appl. No. 13/159,192.
U.S. Appl. No. 12/911,277.
U.S. Appl. No. 13/556,641.
English Language Abstract and Translation of JP 2009-182019 published on Aug. 13, 2009.
English Language Abstract and Translation of JP 2008-198905 published Aug. 28, 2008.
Chinese Office Action issued in CN 201210265293.7 dated May 19, 2014 with English Language Translation.
English Language Abstract of CN1700444 published Nov. 23, 2005.
English Language Abstract of CN101100018 published Jan. 9, 2008.

* cited by examiner

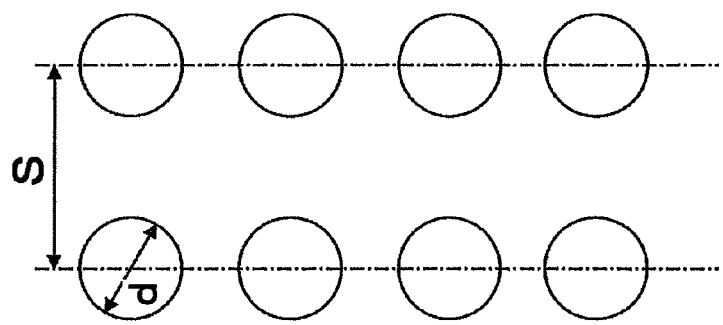
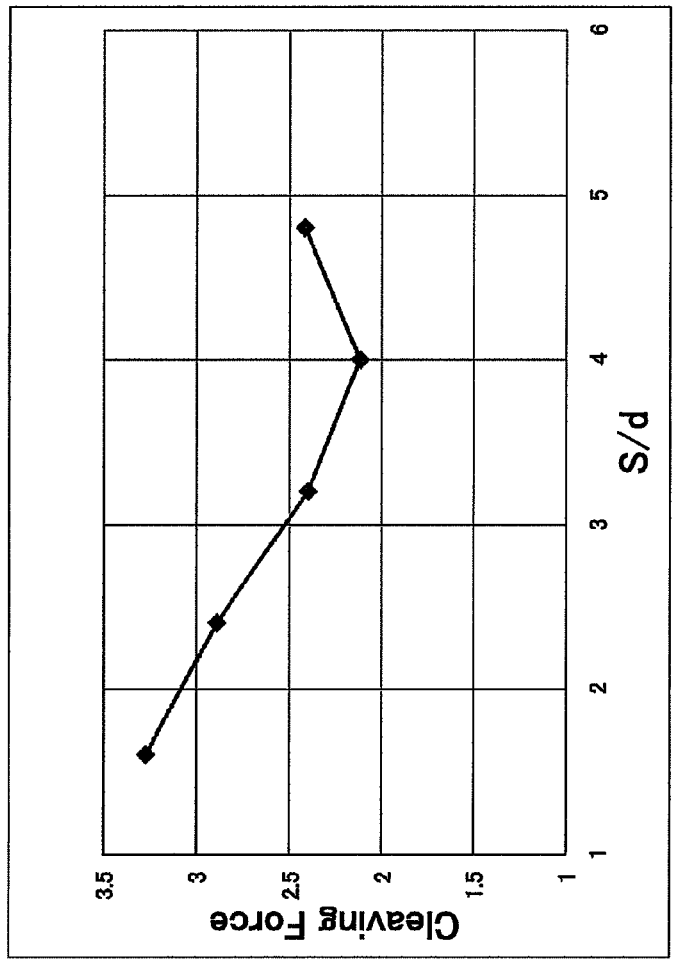
FIG.9

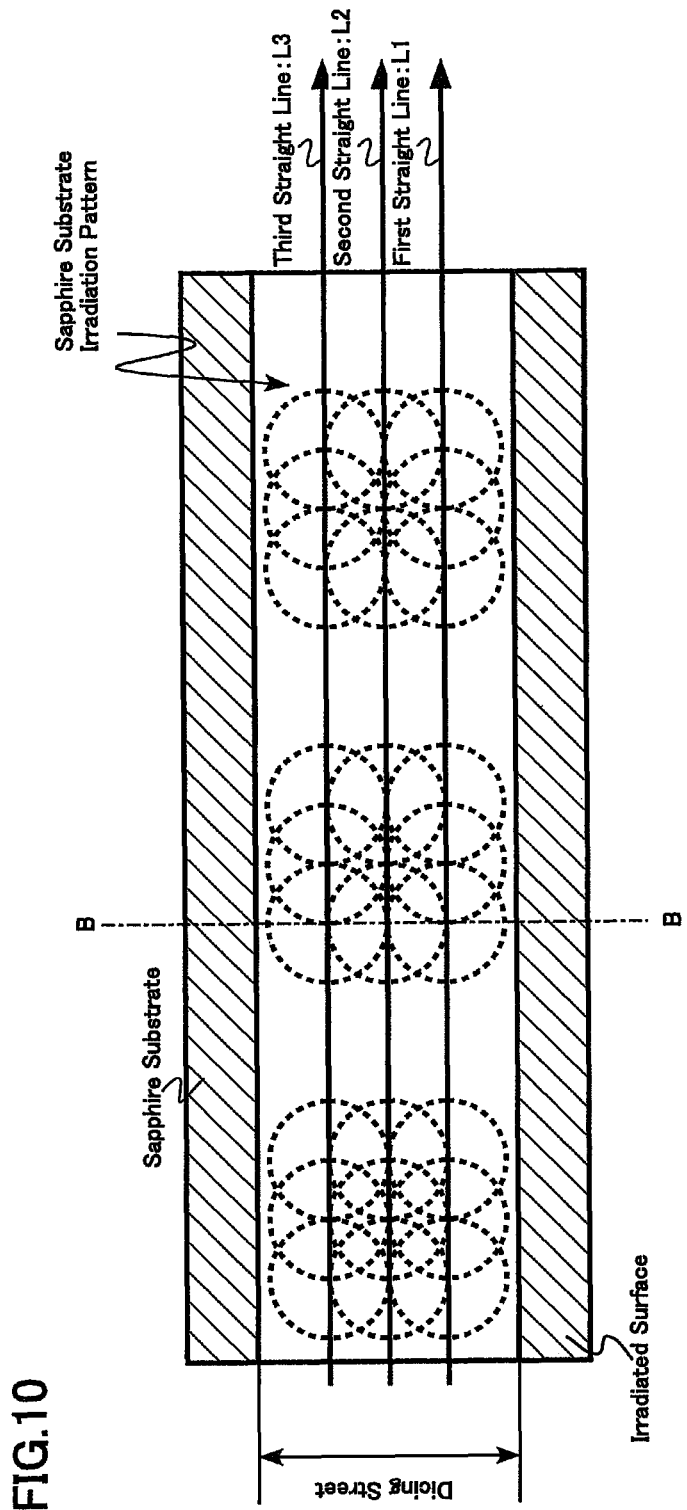

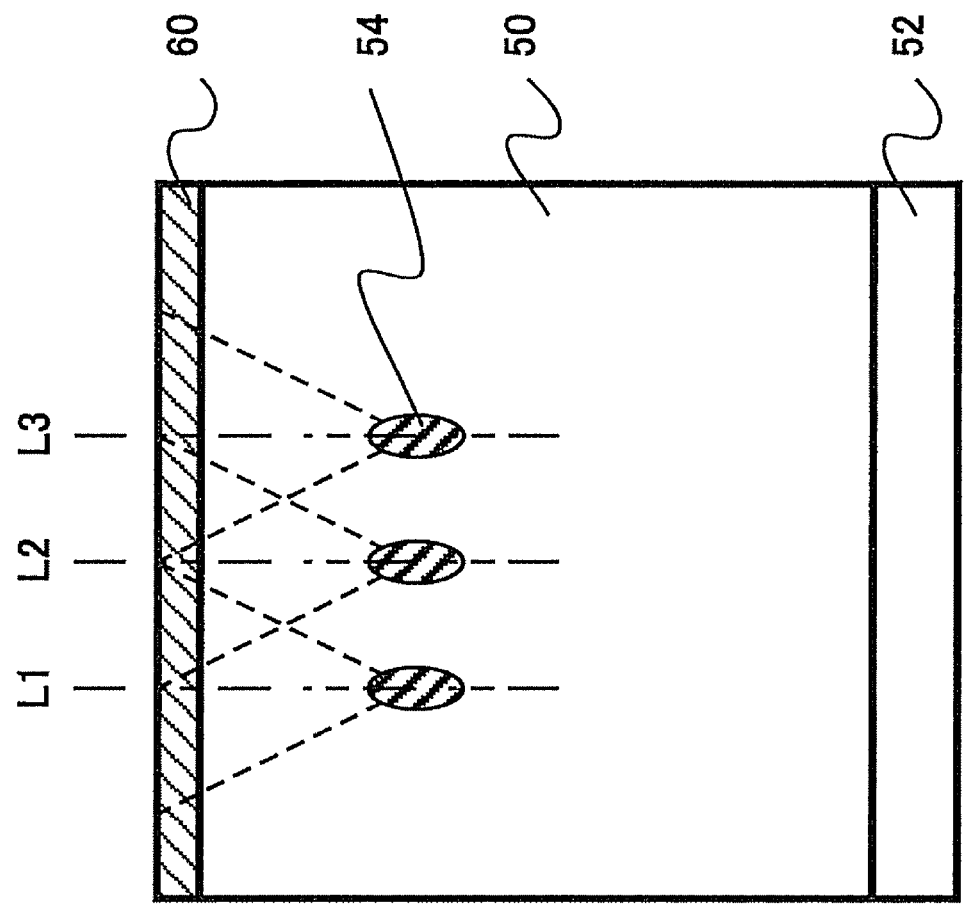

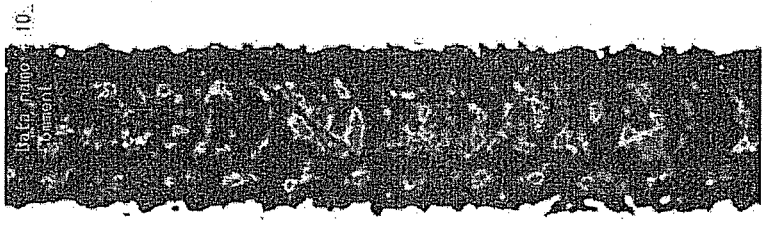
FIG.21A Example 10
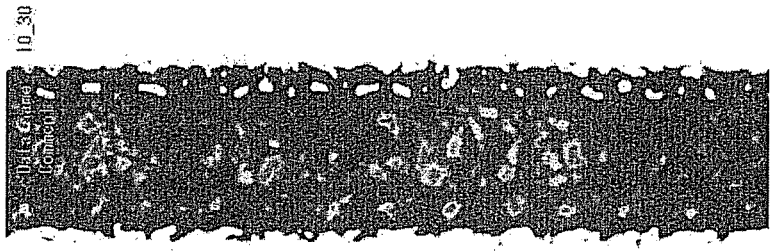
FIG.21B Example 11
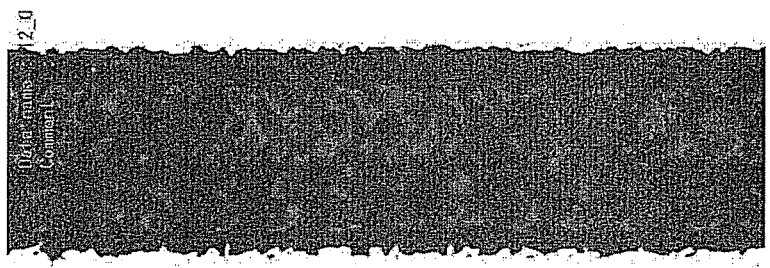
FIG.21C Example 12
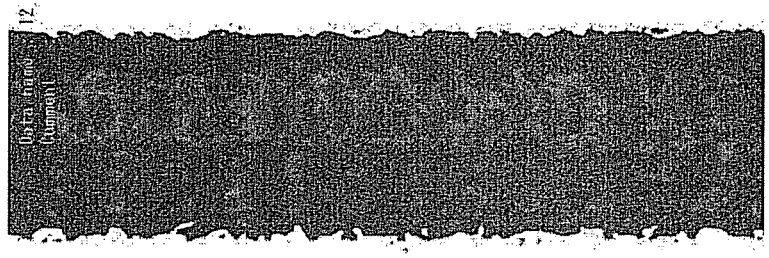
FIG.21D Example 13
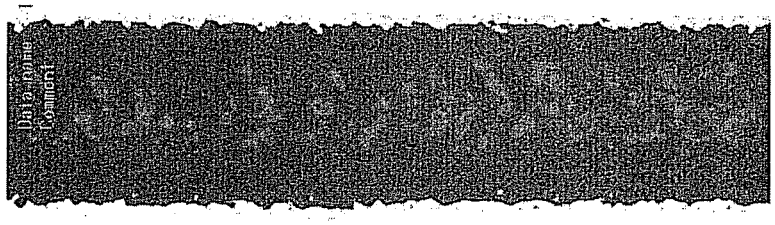
FIG.21E Example 14

LASER DICING METHOD

CROSS-REFERENCE TO RELATED APPLICATION

This application is based on and claims priority of Japanese Patent Application (JPA) No. 2011-164042, filed on Jul. 27, 2011 and Japanese Patent Application (JPA) No. 2012-074937, filed on Mar. 28, 2012, the entire contents of which are incorporated herein by reference.

FIELD OF THE INVENTION

Embodiments described herein relate generally to a laser dicing method in which a pulse laser beam is used.

BACKGROUND OF THE INVENTION

Japanese Patent No. 3867107 discloses a method in which a pulse laser beam is used for dicing of a semiconductor substrate. In the method of Japanese Patent No. 3867107, a crack region is formed in a workpiece by an optical damage generated with a pulse laser beam. The workpiece is cut with the crack region as a starting point.

In the related art, the formation of the crack region is controlled using parameters, such as energy and a spot diameter of the pulse laser beam and a relative moving speed between the pulse laser beam and the workpiece.

SUMMARY OF THE INVENTION

In accordance with a first aspect of the embodiments, a laser dicing method includes: placing a workpiece substrate on a stage; generating a clock signal; emitting a pulse laser beam synchronous with the clock signal; moving relatively the workpiece substrate and the pulse laser beam; switching irradiation and non-irradiation of the workpiece substrate with the pulse laser beam in a unit of light pulse in synchronization with the clock signal to perform first irradiation of the pulse laser beam on a first straight line by controlling passage and cutoff of the pulse laser beam using a pulse picker; switching the irradiation and non-irradiation of the workpiece substrate with the pulse laser beam in a unit of light pulse in synchronization with the clock signal to perform second irradiation of the pulse laser beam on a second straight line, which is adjacent to the first straight line in a substantially parallel fashion, by controlling the passage and cutoff of the pulse laser beam using the pulse picker after the first irradiation; and forming a crack reaching a workpiece substrate surface on the workpiece substrate by the first irradiation and the second irradiation, wherein the crack is continuously formed on the workpiece substrate surface by controlling irradiation energy of the pulse laser beam, a processing point depth of the pulse laser beam, and lengths of an irradiation region and a non-irradiation region of the pulse laser beam.

In the method of the first aspect, preferably the second irradiation is performed at a processing point depth identical to that of the first irradiation.

In the method of the first aspect, preferably an interval between the first and second straight lines, the irradiation energy of the pulse laser beam, the processing point depth of the pulse laser beam, and the lengths of the irradiation region and the non-irradiation region of the pulse laser beam are controlled such that an external force necessary to cleave the workpiece substrate is substantially minimized after the crack formation.

In the method of the first aspect, preferably a pattern of irradiation and non-irradiation of the pulse laser beam in the second irradiation has a relationship in which a pattern of irradiation and non-irradiation of the pulse laser beam in the first irradiation is translated in a direction perpendicular to the first straight line.

In the method of the first aspect, preferably $3.2 \leq S/d \leq 4.8$ holds, where S is an interval between the first straight line and the second straight line, and d is a theoretical beam diameter in a focal position of the pulse laser beam.

In the method of the first aspect, preferably the workpiece substrate is a sapphire substrate.

In the method of the first aspect, preferably a light emitting element is formed on one of principal surfaces of the workpiece substrate, and the workpiece substrate is irradiated pulse laser beam from the other principal surface.

In the method of the first aspect, preferably a metallic film is formed on the other principal surface, and the metallic film is removed by the first irradiation and the second irradiation.

In accordance with a second aspect of the embodiments, a laser dicing method includes: placing a workpiece substrate on a stage; generating a clock signal; emitting a pulse laser beam synchronous with the clock signal; moving relatively the workpiece substrate and the pulse laser beam; switching irradiation and non-irradiation of the workpiece substrate with the pulse laser beam in a unit of light pulse in synchronization with the clock signal to perform first irradiation of the pulse laser beam on a first straight line by controlling passage and cutoff of the pulse laser beam using a pulse picker; switching the irradiation and non-irradiation of the workpiece substrate with the pulse laser beam in a unit of light pulse in synchronization with the clock signal to perform second irradiation of the pulse laser beam at the processing point depth identical to that of the first irradiation on a second straight line, which is adjacent to the first straight line in the substantially parallel fashion, by controlling the passage and cutoff of the pulse laser beam using the pulse picker after the first irradiation; switching the irradiation and non-irradiation of the workpiece substrate with the pulse laser beam in a unit of light pulse in synchronization with the clock signal to perform third irradiation of the pulse laser beam at the processing point depth different from that of the first irradiation on a third straight line, which is identical or substantially parallel to the first straight line, by controlling the passage and cutoff of the pulse laser beam using the pulse picker after the second irradiation; switching the irradiation and non-irradiation of the workpiece substrate with the pulse laser beam in a unit of light pulse in synchronization with the clock signal to perform fourth irradiation of the pulse laser beam at the processing point depth identical to that of the third irradiation on a fourth straight line, which is adjacent to the third straight line in the substantially parallel fashion, by controlling the passage and cutoff of the pulse laser beam using the pulse picker after the third irradiation; and forming a crack reaching a workpiece substrate surface on the workpiece substrate by the first irradiation, the second irradiation, the third irradiation, and the fourth irradiation, wherein the crack is continuously formed on the workpiece substrate surface by controlling irradiation energy of the pulse laser beam, a processing point depth of the pulse laser beam, and lengths of an irradiation region and a non-irradiation region of the pulse laser beam.

In accordance with a third aspect of the embodiments, a laser dicing method includes: placing a workpiece substrate, which includes a metallic film on a surface thereof, on a stage; generating a clock signal; emitting a pulse laser beam synchronous with the clock signal; moving relatively the workpiece substrate and the pulse laser beam; switching irradiation and non-irradiation of the workpiece substrate with the pulse laser beam in a unit of light pulse in synchronization with the clock signal to perform first irradiation of the pulse laser beam from a side of the metallic film on a first straight line by controlling passage and cutoff of the pulse laser beam using a pulse picker; switching the irradiation and non-irradiation of the workpiece substrate with the pulse laser beam in a unit of light pulse in synchronization with the clock signal to perform second irradiation of the pulse laser beam from a side of the metallic film on a second straight line, which is adjacent to the first straight line in a substantially parallel fashion, by controlling the passage and cutoff of the pulse laser beam using the pulse picker after the first irradiation; and forming a crack reaching a workpiece substrate surface on the workpiece substrate at the same time as a removal of the metallic film by the first irradiation and the second irradiation, wherein the crack is continuously formed on the workpiece substrate surface at the same time as the removal of the metallic film by controlling irradiation energy of the pulse laser beam, a processing point depth of the pulse laser beam, and lengths of an irradiation region and a non-irradiation region of the pulse laser beam.

In the method of the third aspect, preferably the second irradiation is performed at a processing point depth identical to that of the first irradiation.

In the method of the third aspect, preferably an LED is formed on a surface of the workpiece substrate on a side opposite to the metallic film.

BRIEF DESCRIPTION OF THE DRAWINGS

FIG. 9 is a view illustrating a relationship among an irradiation row interval S, a beam diameter d of a pulse laser beam, and a cleaving force in the laser dicing method of the first embodiment;

FIG. 10 is an explanatory view of the laser dicing method according to a second embodiment;

FIG. 11 is an explanatory view of the laser dicing method of the second embodiment;

FIGS. 21A to 21E are views illustrating laser dicing results of Examples 10 to 14.

DETAILED DESCRIPTION OF THE INVENTION

Figure 1:
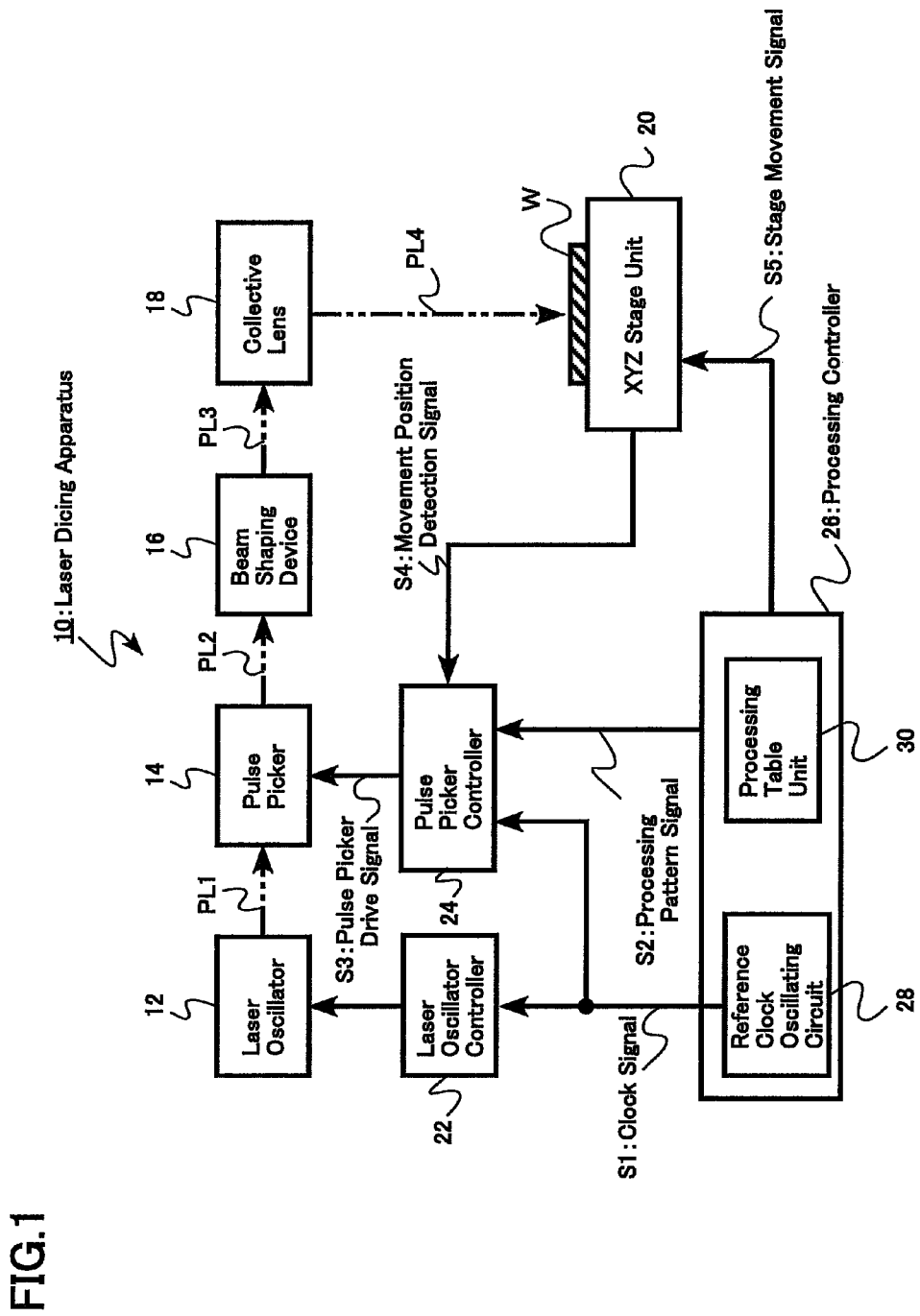
FIG. 1 is a schematic configuration diagram illustrating an example of a laser dicing apparatus used in a laser dicing method according to a first embodiment.

Hereinafter, embodiments described herein will be described with reference to the drawings. As used herein, a processing point means a point that is located near a beam collecting position (focal position) of a pulse laser beam in a workpiece substrate, and the point in which a modified level of the workpiece substrate becomes the maximum in a depth direction. A processing point depth means a depth of a processing point of the pulse laser beam from a surface of the workpiece substrate.

(First Embodiment)

In a laser dicing method according to a first embodiment, a workpiece substrate is placed on a stage, a clock signal is generated, a pulse laser beam is emitted in synchronization with the clock signal, the workpiece substrate and the pulse laser beam are relatively moved, and irradiation and non-irradiation of the workpiece substrate with the pulse laser beam are switched in a unit of light pulse in synchronization with the clock signal to perform first irradiation of the pulse laser beam on a first straight line by controlling passage and cutoff of the pulse laser beam using a pulse picker. The irradiation and non-irradiation of the workpiece substrate with the pulse laser beam are switched in a unit of light pulse in synchronization with the clock signal to perform second irradiation of the pulse laser beam at a processing point depth identical to that of the first irradiation on a second straight line, which is adjacent to the first straight line in a substantially parallel fashion, by controlling the passage and cutoff of the pulse laser beam using the pulse picker after the first irradiation. A crack reaching a workpiece substrate surface is formed on the workpiece substrate by the first irradiation and the second irradiation. The crack is continuously formed on the workpiece substrate surface by controlling irradiation energy of the pulse laser beam, a processing point depth of the pulse laser beam, and lengths of an irradiation region and a non-irradiation region of the pulse laser beam.

According to the first embodiment, the laser dicing method that performs an excellent cleavage characteristic by the above configuration can be provided. Examples of the excellent cleavage characteristics include (1) a cleavage portion is cleaved with good linearity, (2) the cleavage can be performed with a small cleaving force such that a yield of the diced element is improved, (3) an element provided on the substrate, for example, an LED element formed as an epitaxial layer on the substrate is not degraded by an influence of the laser beam irradiation during the crack formation.

Particularly the continuous crack formation on the workpiece substrate surface facilitates the dicing of hard substrates such as a sapphire substrate. The dicing is performed with a narrow dicing width. Additionally, according to the first embodiment, the workpiece substrate is irradiated with the pulse laser beams formed in plural parallel rows at the same processing point depth, which allows the cleaving force to reduce while the processing point depth is kept shallow in the workpiece substrate. Accordingly, the degradation of the element caused by the laser beam irradiation can be suppressed even if light emitting elements, such as the LED and an LD, are formed on a surface on a side opposite to the workpiece substrate.

A laser dicing apparatus of the first embodiment that performs the laser dicing method includes a stage on which the workpiece substrate can be placed, a reference-clock oscillating circuit that generates a clock signal, a laser oscillator that emits a pulse laser beam, a laser-oscillator controller that synchronizes the pulse laser beam with the clock signal, a pulse picker that is provided on an optical path between the laser oscillator and the stage to switch the irradiation and non-irradiation of the workpiece substrate with the pulse laser beam, and a pulse-picker controller that controls the passage and cutoff of the pulse laser beam in the pulse picker in a unit of light pulse in synchronization with the clock signal.

FIG. 1 is a schematic configuration diagram illustrating an example of the laser dicing apparatus of the first embodiment. As illustrated in FIG. 1, a laser dicing apparatus 10 of the first embodiment includes a laser oscillator 12, a pulse picker 14, a beam shaping device (beam former) 16, a collective lens (condensing lens) 18, an XYZ-stage unit 20, a laser-oscillator controller 22, a pulse-picker controller 24, and a processing controller 26. The processing controller 26 includes a reference-clock oscillating circuit 28 that generates a desired clock signal S1 and a processing table unit 30.

The laser oscillator 12 is configured to emits a pulse laser beam PL1 having a period Tc, and the pulse laser beam PL1 is synchronous with a clock signal S1 generated by the reference-clock oscillating circuit 28. Intensity of irradiation pulse beam exhibits a Gaussian distribution. The clock signal S1 is a processing control clock signal used to control laser dicing.

The laser beam emitted from the laser oscillator 12 has a wavelength transmitted through the workpiece substrate. For example, a Nd:YAG laser, a Nd:YVO$_4$ laser, and a Nd:YLF laser can be used. For example, desirably the Nd:YVO$_4$ laser having a wavelength of 532 nm is used in the case that the workpiece substrate is a sapphire substrate.

The pulse picker 14 is provided on an optical path between the laser oscillator 12 and the collective lens 18. The pulse picker 14 switches between passage and cutoff (on/off) of the pulse laser beam PL1 in synchronization with the clock signal S1, thereby switching between irradiation and non-irradiation of the workpiece substrate with pulse laser beam PL1 in a unit of the number of light pulses. Thus, the on/off of the pulse laser beam PL1 is controlled by the operation of the pulse picker 14 in order to process the workpiece substrate, and the pulse laser beam PL1 becomes a modulated pulse laser beam PL2.

For example, desirably the pulse picker 14 is constructed by an acousto-optic element (AOM). Alternatively, the pulse picker 14 may be constructed by a Raman diffraction type electro-optic element (EOM).

The beam shaping device 16 converts the incident pulse laser beam PL2 into a pulse laser beam PL3 having a desired shape. For example, the beam shaping device 16 is a beam expander that magnifies a beam diameter with given magnification. For example, an optical element, such as a homogenizer, which homogenizes a light intensity distribution of a beam section may be included. For example, an optical element that forms the beam section into a circular shape or an optical element that circularly polarizes the beam may be included.

The collective lens 18 is configured to collect the pulse laser beam PL3 shaped by the beam shaping device 16 and to irradiate a workpiece substrate W placed on the XYZ-stage unit 20, such as a sapphire substrate in which the LED is formed on a lower surface, with a pulse laser beam PL4.

The XYZ-stage unit 20 includes an XYZ-stage (hereinafter also simply referred to as a stage), a drive mechanism of the XYZ-stage, and a position sensor, for example having a laser interferometer that measures a position of the XYZ-stage. The workpiece substrate W can be placed on the XYZ-stage 20 that is movable in X-, Y-, and Z-directions. The XYZ-stage is configured such that positioning accuracy and a movement error fall within a submicron range. The XYZ-stage is moved in the Z-direction to adjust a focal position of the pulse laser beam with respect to the workpiece substrate W, which allows the processing point depth to be controlled.

The processing controller 26 totally controls the processing of the laser dicing apparatus 10. The reference-clock oscillating circuit 28 generates the desired clock signal S1. A processing table in which dicing data is described in the number of light pulses of the pulse laser beam is stored in the processing table unit 30.

The laser dicing method in which the laser dicing apparatus 10 is used will be described with reference to FIGS. 1 to 7.

The workpiece substrate W, such as the sapphire substrate, is placed on the XYZ-stage unit 20. For example, the sapphire substrate is a wafer in which plural LEDs are patterned and formed on a GaN layer that is epitaxially grown on one (lower surface) of principal surfaces. The wafer is positioned with respect to the XYZ-stage based on a notch or an orientation flat, which is formed in the wafer.

Figure 2:
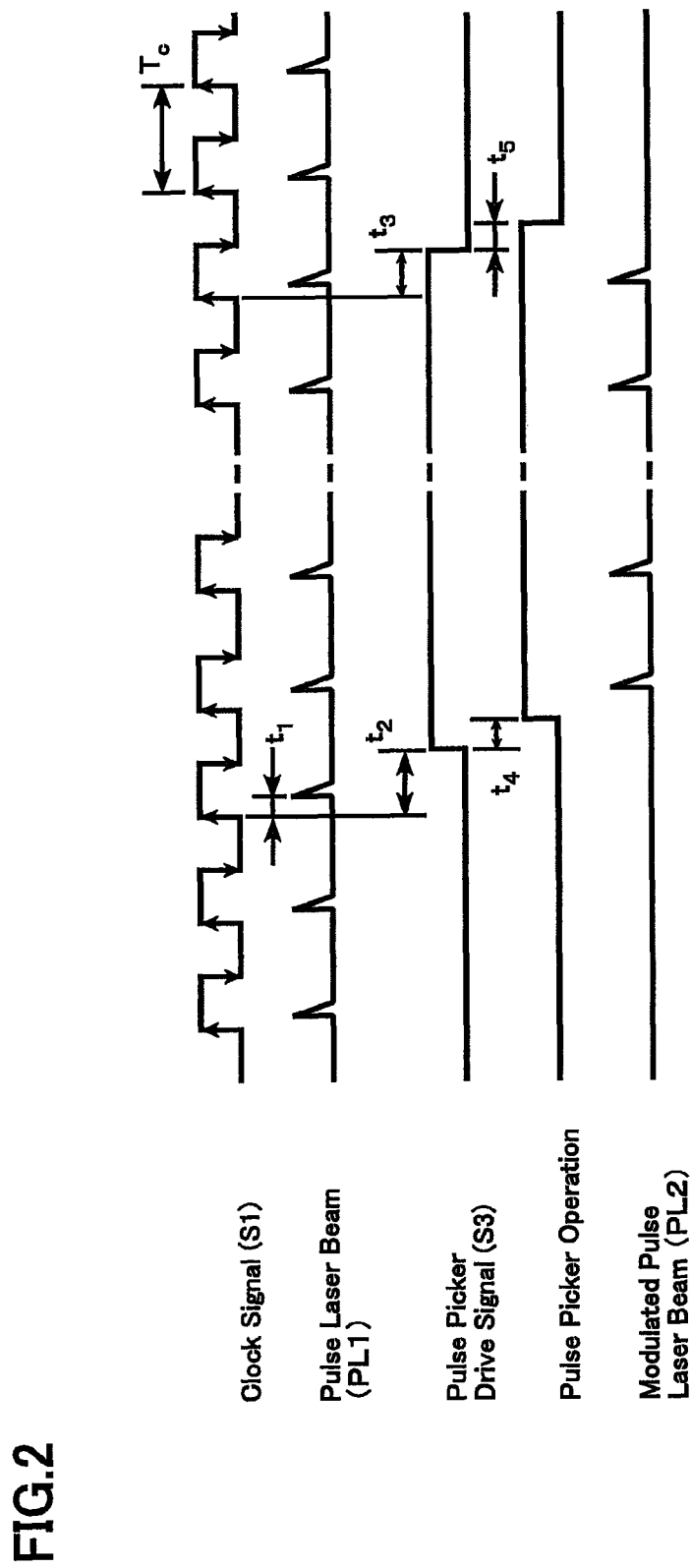
FIG. 2 is a view illustrating timing control of the laser dicing method of the first embodiment.

FIG. 2 is a view illustrating timing control of the laser dicing method of the first embodiment. The reference-clock oscillating circuit 28 of the processing controller 26 generates the clock signal S1 having the period Tc. The laser-oscillator controller 22 performs the control such that the laser oscillator 12 emits the pulse laser beam PL1 having the period Tc, which is synchronized with the clock signal S1. At this point, a delay time $t_1$ is generated between rise of the clock signal S1 and rise of the pulse laser beam.

The laser beam has a wavelength transmitted through the workpiece substrate. Preferably the laser beam in which energy hv of a photon of the irradiated laser beam is larger than a band gap Eg of absorption of a workpiece substrate material is used. The absorption of the laser beam is generated when the energy hv is extremely larger than the band gap Eg. This is called multiphoton absorption. When a pulse width of the laser beam is extremely shortened to generate the multiphoton absorption in the workpiece substrate, the energy of the multiphoton absorption is not transformed into thermal energy, but permanent structure changes, such as a change in valence of ion, crystallization, an amorphous structure, an orientation polarization, and a microcrack, are induced to form a color center.

In the irradiation energy (irradiation power) of the laser beam (pulse laser beam), an optimum condition is selected to form the continuous crack on the workpiece substrate surface.

When the laser beam having the wavelength transmitted through the workpiece substrate material is used, the laser beam can be guided and collected to the neighborhood of the focal point in the substrate. Accordingly, the color center can locally be produced. Hereinafter the color center is referred to as a modified region (or reformed region).

The pulse-picker controller 24 refers to the processing pattern signal S2 output from the processing controller 26, and generates the pulse-picker drive signal S3 synchronous with clock signal S1. The processing pattern signal S2 is generated by referring to the processing table stored in the processing table unit 30. In the processing table, information on the irradiation pattern is described in a unit of light pulse by the number of light pulses. Based on the pulse-picker drive signal S3, the pulse picker 14 performs an operation to synchronize with the clock signal S1 to switch between the passage and the cutoff (on/off) of the pulse laser beam PL1. The modulated pulse laser beam PL2 is generated by the operation of the pulse picker 14. Delay times $t_2$ and $t_3$ are generated between the rise of the clock signal S1 and the rise of the pulse laser beam and between the rise of the clock signal S1 and fall of the pulse laser beam. Delay times $t_4$ and $t_5$ are generated between the rise of the pulse laser beam and the pulse-picker operation and between the fall of the pulse laser beam, and the pulse-picker operation.

In processing the workpiece substrate, generation timing of the pulse-picker drive signal S3 and relative movement timing between the workpiece substrate and the pulse laser beam are determined in consideration of the delay times $t_1$ to $t_5$.

Figure 3:
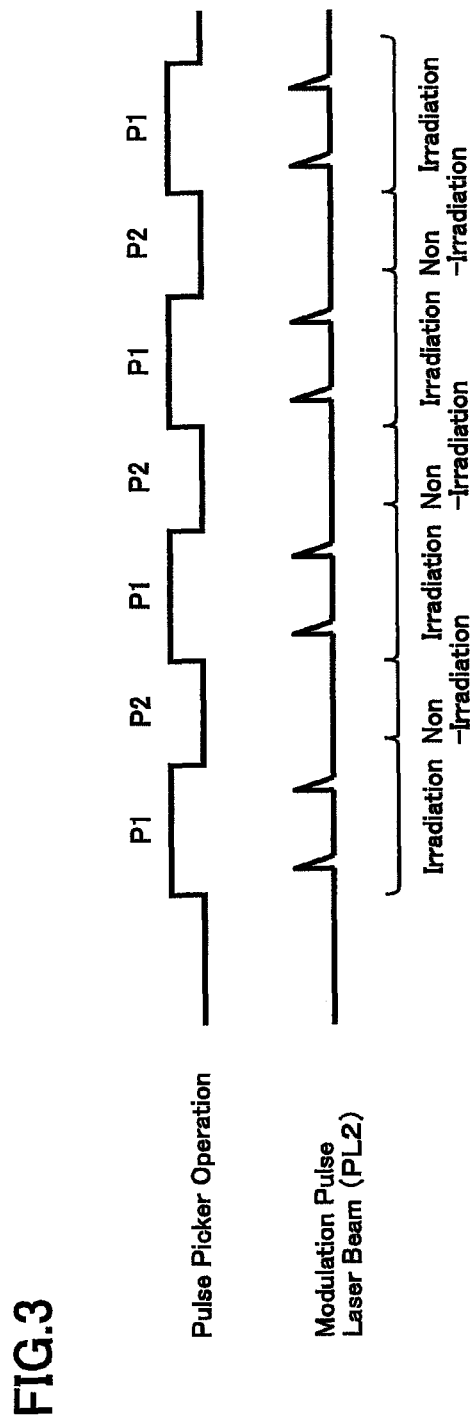
FIG. 3 is a view illustrating timing of a pulse-picker operation and a modulated pulse laser beam of the laser dicing method of the first embodiment.

FIG. 3 is a view illustrating timing of the pulse-picker operation and the modulated pulse laser beam PL2 of the laser dicing method of the first embodiment. The pulse-picker operation is switched in a unit of light pulse in synchronization with the clock signal S1. An irradiation pattern in a unit of light pulse can be yielded by synchronizing the oscillation of the pulse laser beam and the pulse-picker operation with the clock signal S1.

Specifically, the irradiation and non-irradiation of the pulse laser beam are performed on a predetermined condition specified by the number of light pulses. That is, based on the number of irradiation light pulses (P1) and the number of non-irradiation light pulses (P2), the pulse-picker operation is performed to switch the irradiation and non-irradiation on the workpiece substrate. For example, the value of P1 and the value of P2, which specify the irradiation pattern of the pulse laser beam, are defined as an irradiation region register setting and a non-irradiation region register setting in the processing table. The value of P1 and the value of P2 are set to predetermined conditions in which the crack formation is optimized during the dicing by a material for the workpiece substrate, the laser beam condition, and the like.

The modulated pulse laser beam PL2 is converted into the pulse laser beam PL3 that is formed into the desired shape by the beam shaping device 16. The shaped pulse laser beam PL3 is converted into the pulse laser beam PL4 that is collected by the collective lens 18 to have the desired beam diameter, and the wafer that is of the workpiece substrate was irradiated with the pulse laser beam PL4.

In the case that the wafer is diced in the X-axis direction and the Y-axis direction, for example, the wafer is scanned with the pulse laser beam PL4 while the XYZ-stage is moved at a constant speed in the X-axis direction. After the dicing in the desired X-axis direction, the wafer is scanned with the pulse laser beam PL4 while the XYZ-stage is moved at a constant speed in the Y-axis direction. Therefore, the dicing is performed in the Y-axis direction.

An interval between irradiation and non-irradiation of the pulse laser beam is controlled by the number of irradiation light pulses (P1), the number of non-irradiation light pulses (P2), and the stage speed.

As used herein, "length of irradiation region" means a length in a scanning direction in a region where an irradiation spot is irradiated on the workpiece substrate surface, and "length of non-irradiation region" means a length in the scanning direction in a region where the irradiation spot is not irradiated on the workpiece substrate surface.

In the Z-axis direction (height direction), adjustment is made such that the beam collecting position (focal position) of the wafer is located in a predetermined depth. The predetermined depth is set such that a crack is formed into a desired shape in the workpiece substrate surface during the dicing.

At this point, assuming that n is a refractive index of the workpiece substrate, L is a processing position from the workpiece substrate surface, and Lz is a Z-axis movement distance, Lz=L/n is obtained. That is, assuming that the beam collecting position by the collective lens is a Z-axis initial position of the workpiece substrate surface, the Z-axis may be moved by "Lz" in the case that the workpiece substrate is processed at a depth "L" from the workpiece substrate surface.

Figure 4:
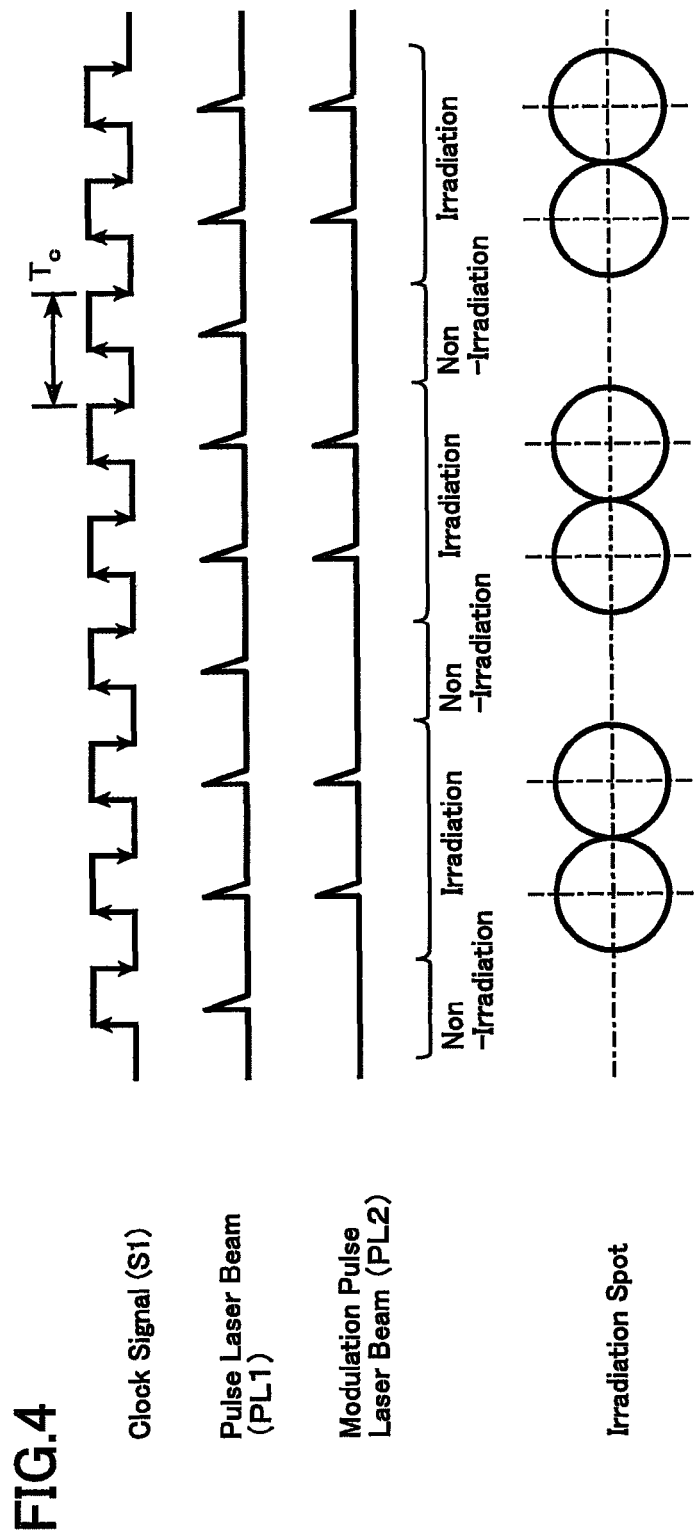
FIG. 4 is an explanatory view of an irradiation pattern of the laser dicing method of the first embodiment.

FIG. 4 is an explanatory view of the irradiation pattern of the laser dicing method of the first embodiment. As illustrated in FIG. 4, the pulse laser beam PL1 is generated in synchronization with the clock signal S1. The passage and the cutoff of the pulse laser beam are controlled in synchronization with the clock signal S1, thereby generating the modulated pulse laser beam PL2.

The irradiation light pulse of the modulated pulse laser beam PL2 is formed as the irradiation spot on the wafer by the movement of the stage in a lateral direction (X-axis direction or Y-axis direction). By generating the modulated pulse laser beam PL2, the wafer is intermittently irradiated while the irradiation spot is controlled in a unit of light pulse. In FIG. 4, letting the number of irradiation light pulses (P1)=2 and the number of non-irradiation light pulses (P2)=1 sets the condition that the irradiation and the non-irradiation with the irradiation light pulse (Gaussian light) are alternately repeated at a pitch of the spot diameter. In the first embodiment, the pulse laser beam irradiation is performed by scanning the wafer with the laser beams that are close to each other in a parallel fashion.

At this point, when the processing is performed on the following conditions, beam spot diameter: D (μm)

repetitive frequency: F (KHz)

in order that the irradiation light pulse alternately repeats the irradiation and the non-irradiation with the pitch of the spot diameter, a stage moving speed V (m/sec) is obtained as follows.

$$V = D \times 10^{-6} \times F \times 10^3$$

For example, when the processing is performed on the following conditions, beam spot diameter: D=2 μm repetitive frequency: F=50 KHz the stage moving speed is obtained as follows.

V=100 mm/sec

Assuming that P (watt) is power of the irradiation light, the wafer is irradiated with the light pulse having the irradiation pulse energy P/F per pulse.

Parameters of the irradiation energy (power of irradiation light) of the pulse laser beam, the processing point depth of the pulse laser beam, and an interval between the irradiation and the non-irradiation of the pulse laser beam are determined such that the crack is continuously formed on the workpiece substrate surface.

Figure 5:
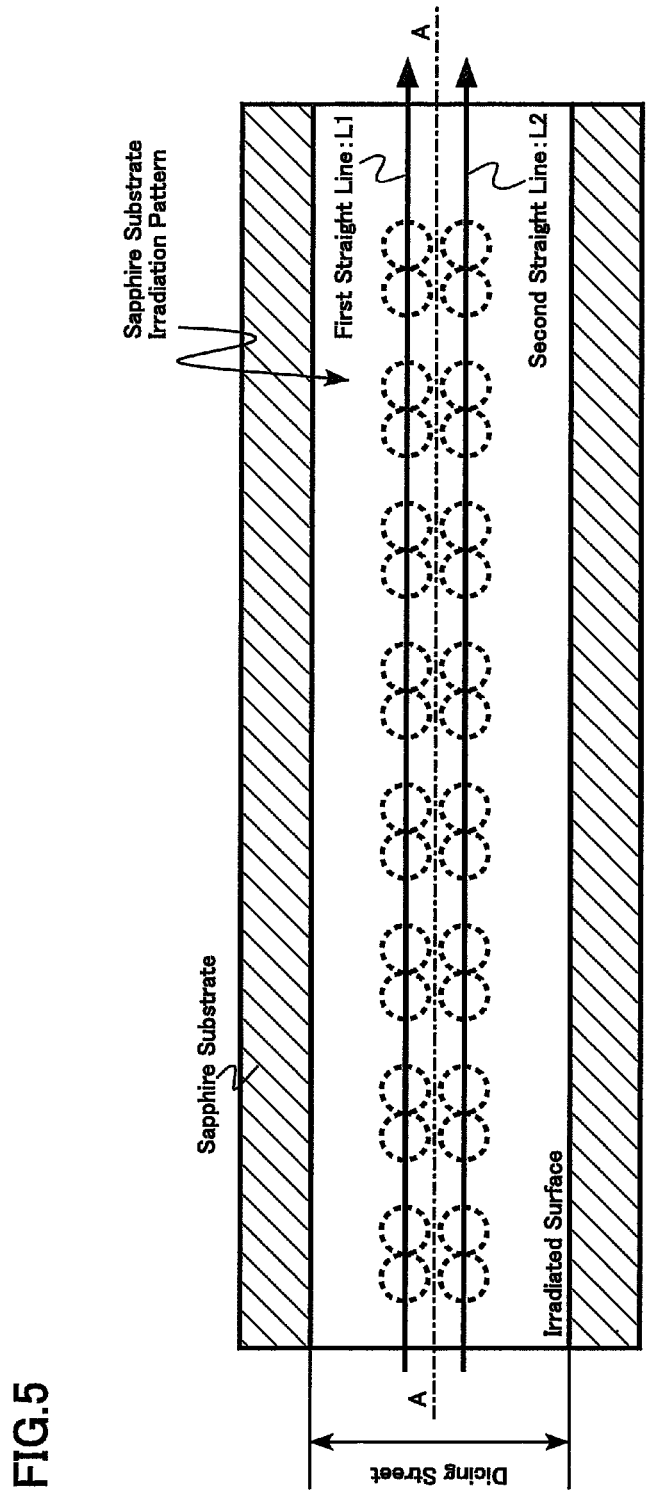
FIG. 5 is a plan view illustrating the irradiation pattern with which a sapphire substrate of the first embodiment is irradiated.

FIG. 5 is a plan view illustrating the irradiation pattern with which the sapphire substrate is irradiated. In the first embodiment, the irradiation and non-irradiation of the sapphire substrate with the pulse laser beam are switched in a unit of light pulse in synchronization with the clock signal to perform first irradiation of the pulse laser beam on a first straight line L1 by controlling the passage and the cutoff of the pulse laser beam using the pulse picker. After the first irradiation, similarly to the first irradiation, the irradiation and non-irradiation of the sapphire substrate with the pulse laser beam are switched in a unit of light pulse in synchronization with the clock signal to perform second irradiation of the pulse laser beam at the processing point depth identical to that of the first irradiation on a second straight line L2, which is adjacent to the first straight line L1 in a substantially parallel fashion, by controlling the passage and cutoff of the pulse laser beam using the pulse picker.

As used herein, the identical processing point depth means a concept in which a depth deviation caused by an error of the processing control is permitted.

FIG. 5 illustrates an example in which, in both the first irradiation and the second irradiation, the irradiation spots are formed with the number of irradiation light pulses (P1)=2, the number of non-irradiation light pulses (P2)=1, and the pitch of the irradiation spot diameter when viewed from the irradiation surface. Thus, from the viewpoint of forming the crack with good linearity and reducing the external force (cleaving force) necessary to cleave the sapphire substrate after the crack formation, desirably the pattern of the irradiation and the non-irradiation of the pulse laser beam in the second irradiation has the relationship in which the pattern of the irradiation and the non-irradiation of the pulse laser beam in the first irradiation is parallelly translated in the direction perpendicular to the first straight line. That is, in the irradiation pattern, desirably the irradiation spots in the first irradiation and the second irradiation are arrayed right beside in the scanning direction. The relationship is referred to as "the irradiation pattern in the row direction are in-phase (same phase)".

As illustrated in FIG. 5, the first straight line and the second straight line are located on an identical dicing street. As used herein, for example, the dicing street means a boundary region between the plural LED elements formed on the surface on the side opposite to the sapphire substrate, and a region where a margin is set to an extent that an influence of the dicing does not affect the LED element in cleaving the sapphire substrate into each LED element. The dicing street is also referred to as a dicing line.

Figure 6:
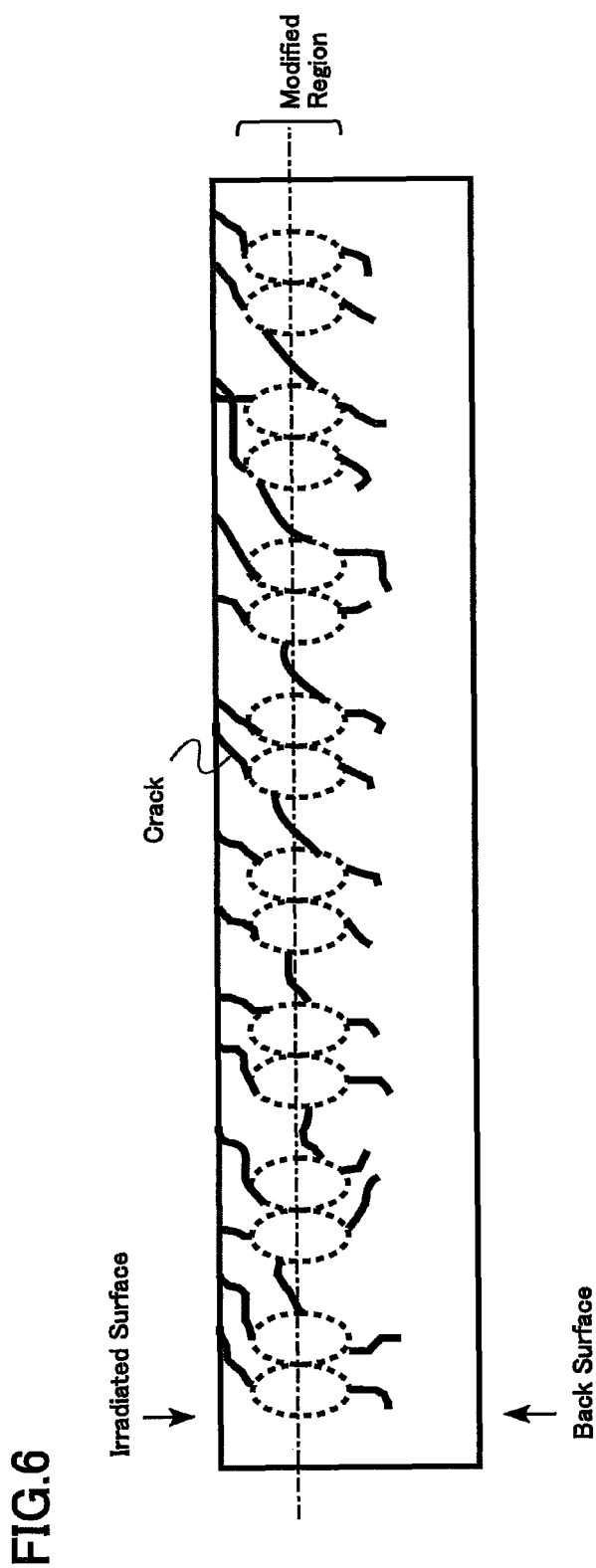
FIG. 6 is a sectional view taken on a line A-A of FIG. 5.

FIG. 6 is a sectional view taken on a line A-A of FIG. 5. As illustrated in FIG. 6, a modified region is formed in the sapphire substrate. The crack (or groove) is formed so as to reach the substrate surface from the modified region along the scanning line of the light pulse. The crack is continuously formed on the workpiece substrate surface. In the first embodiment, the crack is formed so as to be exposed only onto the substrate surface side, but the crack does not reach the backside.

After the crack formation, for example, the external force is applied using a breaker to cleave the sapphire substrate. At this point, desirably the interval of the first and second straight lines, the irradiation energy of the pulse laser beam, the processing point depth of the pulse laser beam, and the lengths of the irradiation region and the non-irradiation region of the pulse laser beam are controlled such that the external force is substantially minimized. After the crack formation, the sapphire substrate may naturally be cleaved without applying the external force.

Figure 7:
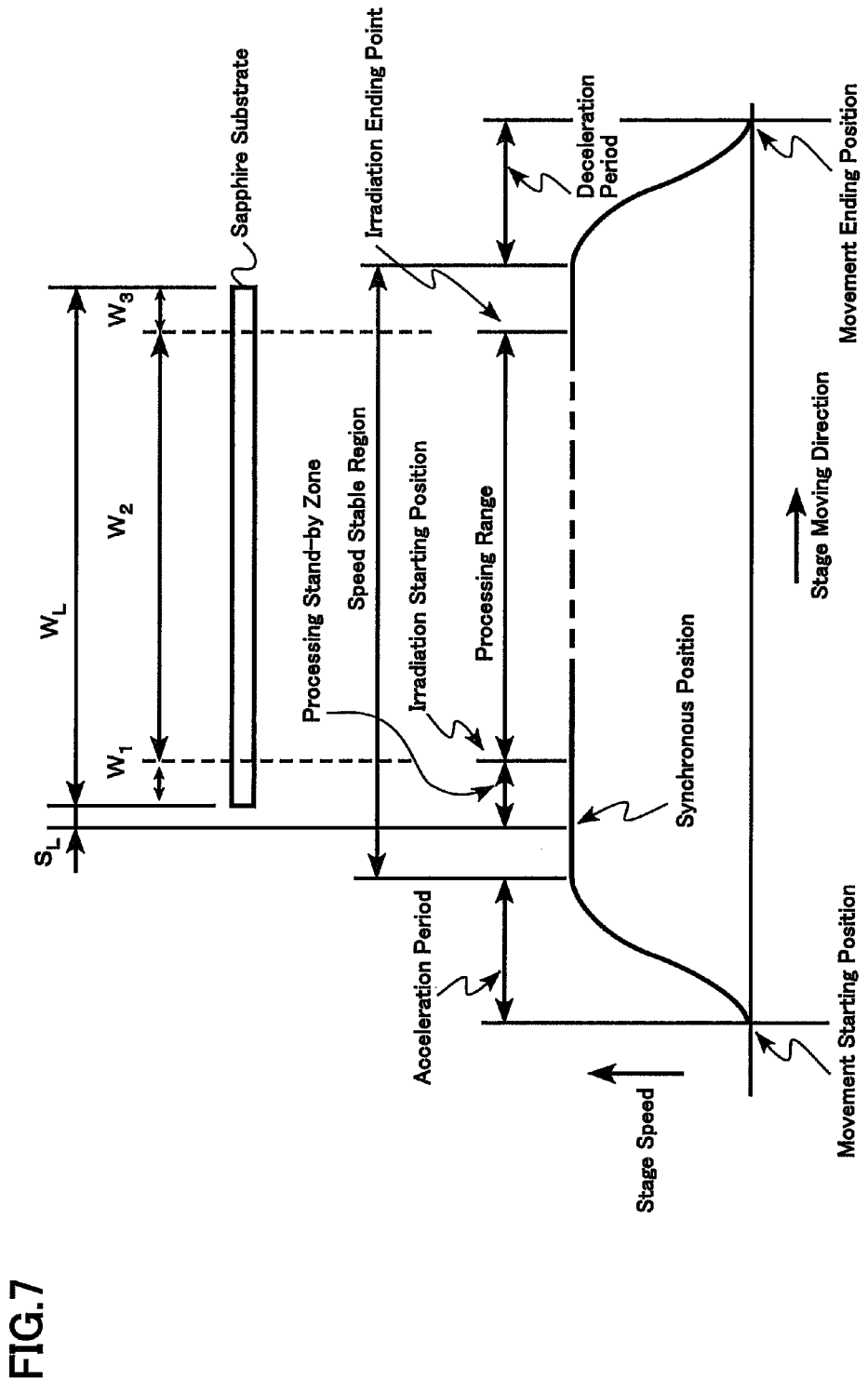
FIG. 7 is a view illustrating a relationship between a stage movement and dicing of the first embodiment.

FIG. 7 is a view illustrating a relationship between the stage movement and the dicing. Position sensors that detect movement positions in the X-axis and Y-axis directions are provided in the XYZ-stage. For example, after the movement of the stage in the x-axis or Y-axis direction is started, the position in which the stage speed enters speed stable zone is previously set to a synchronous position. When the position sensor detects the synchronous position, a movement-position detection signal S4 (FIG. 1) is sent to the pulse-picker controller 24 to permit the pulse-picker operation, and the pulse picker is operated by the pulse-picker drive signal S3. For example, the synchronous position is set to an end surface of the workpiece substrate, and the position sensor may detect the end surface.

Thus, $S_L$: distance from synchronous position to substrate $W_L$: processing length $W_1$: distance from substrate end to irradiation starting position $W_2$: processing range $W_3$: distance from irradiation ending position to substrate end are managed.

As described above, the position of the stage and the position of the workpiece substrate placed on the stage are synchronized with the pulse-picker operation starting position. That is, the irradiation and the non-irradiation of the pulse laser beam are synchronized with the stage position. Therefore, during the irradiation and the non-irradiation of the pulse laser beam, it is ensured that the stage moves at a constant speed (exists in a speed stable zone). Accordingly, regularity of the irradiation spot position is ensured to form the stable crack.

Figure 8A:
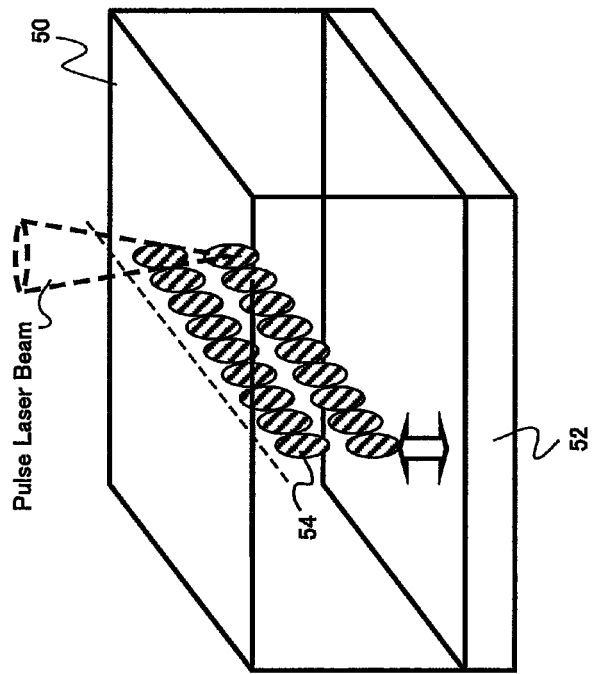
FIGS. 8A and 8B are views illustrating working of the laser dicing method of the first embodiment.
Figure 8B:
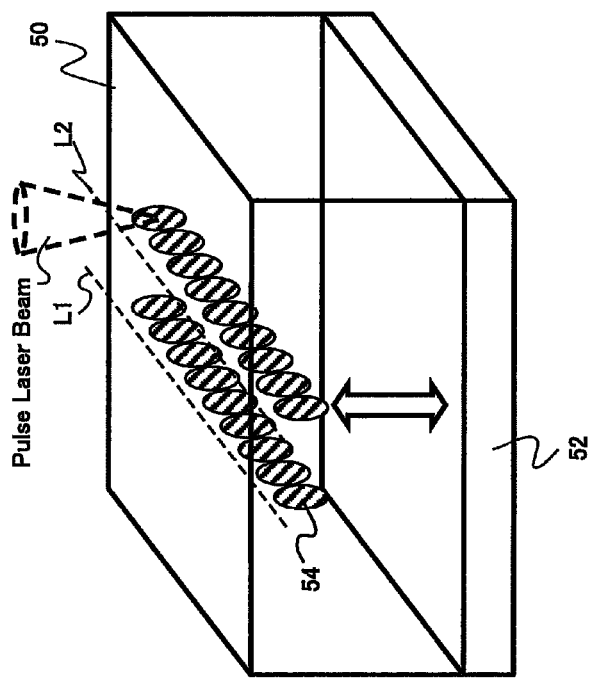

FIGS. 8A and 8B are views illustrating working of the laser dicing method of the first embodiment. FIG. 8A illustrates the case of the first embodiment, and FIG. 8B illustrates the case that the crack is formed by scanning the substrate twice with the pulse laser beam having different processing point depths on the identical scanning line.

As illustrated in FIG. 8A, in the first embodiment, a sapphire substrate 50 is irradiated with the pulse laser beams, which are close to each other in the parallel fashion, at the identical depth. In FIG. 8B, the sapphire substrate 50 is irradiated with the pulse laser beams at the different depths on the identical straight line. In the method of FIG. 8B, when the sapphire substrate 50 is cleaved, the cleaving force is reduced by irradiating the sapphire substrate 50 twice at the different depths.

In the first embodiment, the sapphire substrate 50 can be cleaved with a small cleaving force by irradiating the sapphire substrate 50 with the pulse laser beam close to each other at the identical depth. Therefore, during the cleavage, the linearity of the cleavage portion is improved, and the generation of a broken piece or a fragment of the workpiece substrate is suppressed during the cleavage, thereby improving the dicing yield.

Additionally, in the case that elements, such as the LED, are provided in one of the surfaces of the sapphire substrate 50, namely, in the epitaxial layer 52 on the surface on the side opposite to the irradiation surface, in the first embodiment, the distance from a modified region 54 formed by the irradiation to the epitaxial layer can be lengthened compared with the method in which the sapphire substrate 50 is irradiated twice at the different depths. Accordingly, the element characteristic degradation caused by the influence of the laser beam can be suppressed during the laser dicing. The dicing yield is also improved from this viewpoint.

FIG. 9 is a view illustrating a relationship among an irradiation row interval S, a beam diameter d of the pulse laser beam, and the cleaving force in the laser dicing method of the first embodiment. As used herein, the irradiation row interval means an interval between the first straight line L1 and the second straight line L2 in FIG. 5, namely, the distance between the first straight line L1 and the second straight line L2. The beam diameter d means a theoretical beam diameter in the focal position of the pulse laser beam, and a value that is obtained by calculation when the laser irradiation condition is fixed.

The cleaving force means a value of the external force that is necessary to cleave the workpiece substrate after the crack is formed by the pulse laser beam irradiation. FIG. 9 illustrates the measurement result when the sapphire substrate is used as the workpiece substrate.

As illustrated in FIG. 9, there is a region where the cleaving force takes a local minimum for S/d. Desirably the laser dicing is performed on the S/d condition that the cleaving force takes the local minimum. Accordingly, assuming that S is the interval between the first straight line and the second straight line and that d is the theoretical beam diameter in the focal position of the pulse laser beam, desirably $3.2 \leq S/d \leq 4.8$ holds from FIG. 9, and more desirably $3.5 \leq S/d \leq 4.5$ holds.

In the first embodiment, the reason the substrate can be cleaved with the relatively small cleaving force is that stresses, which are generated in the substrate between the modified regions by the modified regions formed in two rows in parallel by the first irradiation and the second irradiation, act mutually on each other to be able to effectively form the linear crack on the substrate surface. The reason the cleaving force takes the local minimum for S/d is that interaction of the stresses decreases due to the distance when the irradiation row interval S increases excessively with respect to the beam diameter d, and that the interaction of the stresses decreases because the distance between the modified regions is shortened or the modified regions overlap each other when the irradiation row interval S decreases excessively.

The same conditions as the sapphire substrate hold in the case that the workpiece substrate is made of materials except sapphire, for example, quartz glass, rock crystal, silicon, and silicon carbide (SiC).

In the first embodiment, by way of example, the processing point depth of the first irradiation is identical to that of the second irradiation. Alternatively, for example, the processing point depth may positively be varied in the first irradiation and the second irradiation in order to finely adjust the position and the shape of the crack that is formed on the workpiece substrate surface by the dicing.

In the case that the thick substrate is processed, it is conceivable to adopt a method in which the workpiece substrate is repeatedly scanned by the pulse laser beams having the different processing point depths to form the crack after the first irradiation and the second irradiation, thereby improving the cleavage characteristic.

That is, in the laser dicing method, the workpiece substrate is placed on the stage, the clock signal is generated, the pulse laser beam is emitted in synchronization with the clock signal, the workpiece substrate and the pulse laser beam are relatively moved, the irradiation and non-irradiation of the workpiece substrate with the pulse laser beam are switched in a unit of light pulse in synchronization with the clock signal to perform the first irradiation of the pulse laser beam on the first straight line by controlling the passage and cutoff of the pulse laser beam using the pulse picker, the irradiation and non-irradiation of the workpiece substrate with the pulse laser beam are switched in a unit of light pulse in synchronization with the clock signal to perform the second irradiation of the pulse laser beam at the processing point depth identical to that of the first irradiation on the second straight line, which is adjacent to the first straight line in the substantially parallel fashion, by controlling the passage and cutoff of the pulse laser beam using the pulse picker after the first irradiation, the irradiation and non-irradiation of the workpiece substrate with the pulse laser beam are switched in a unit of light pulse in synchronization with the clock signal to perform third irradiation of the pulse laser beam at the processing point depth different from that of the first irradiation on a third straight line, which is identical or substantially parallel to the first straight line, by controlling the passage and cutoff of the pulse laser beam using the pulse picker after the second irradiation, the irradiation and non-irradiation of the workpiece substrate with the pulse laser beam are switched in a unit of light pulse in synchronization with the clock signal to perform fourth irradiation of the pulse laser beam at the processing point depth identical to that of the third irradiation on a fourth straight line, which is adjacent to the third straight line in the substantially parallel fashion, by controlling the passage and cutoff of the pulse laser beam using the pulse picker after the third irradiation, and the crack reaching the workpiece substrate surface is formed on the workpiece substrate by the first irradiation, the second irradiation, the third irradiation, and the fourth irradiation. The irradiation energy of the pulse laser beam, the processing point depth of the pulse laser beam, and the lengths of the irradiation region and the non-irradiation region of the pulse laser beam are controlled.

The irradiation is performed over the plural layers with the pulse laser beams substantially parallel to each other at the identical processing point depth. Therefore, the laser dicing method in which, even for the thick substrate, the cleaving force can reduce, the generation of the crack is suppressed by optimizing the pulse-laser-beam irradiation condition, and the excellent cleavage characteristic is implemented can be provided.

In the case that the plural layers are processed, the relationship of the pulse irradiation position can arbitrarily be controlled with high accuracy during the scans at different depths by synchronizing the stage position with the pulse-picker operation starting position, and the dicing condition can be optimized.

From the viewpoint of not widening the dicing width more than necessary, desirably the first irradiation and the third irradiation or the fourth irradiation are performed on the identical straight line (identical scanning line), and the second irradiation and the fourth irradiation or the third irradiation are performed on the identical straight line (identical scanning line).

(Second Embodiment)

A laser dicing method according to a second embodiment is identical to that of the first embodiment except that the LED (Light Emitting Diode) is formed on one of principal surfaces of the workpiece substrate, that a metallic film is formed on the other principal surface, and that the metallic film is removed by the first irradiation and the second irradiation of the pulse layer beam. Accordingly, the description overlapping the first embodiment is omitted.

In the laser dicing method of the second embodiment, a workpiece substrate, which includes a metallic film on a surface thereof, is placed on a stage, a clock signal is generated, a pulse laser beam is emitted in synchronization with the clock signal, the workpiece substrate and the pulse laser beam are relatively moved, irradiation and non-irradiation of the workpiece substrate with the pulse laser beam are switched in a unit of light pulse in synchronization with the clock signal to perform first irradiation of the pulse laser beam from a side of the metallic film on a first straight line by controlling passage and cutoff of the pulse laser beam using a pulse picker, the irradiation and non-irradiation of the workpiece substrate with the pulse laser beam are switched in a unit of light pulse in synchronization with the clock signal to perform second irradiation of the pulse laser beam from a side of the metallic film on a second straight line, which is adjacent to the first straight line in a substantially parallel fashion, by controlling the passage and cutoff of the pulse laser beam using the pulse Dicker after the first irradiation, and a crack reaching a workpiece substrate surface is formed on the workpiece substrate at the same time as the removal of the metallic film by the first irradiation and the second irradiation. The crack is continuously formed on the workpiece substrate surface at the same time as the removal of the metallic film is removed by controlling irradiation energy of the pulse laser beam, a processing point depth of the pulse laser beam, and lengths of an irradiation region and a non-irradiation region of the pulse laser beam.

There is a light emitting apparatus in which the LED is formed in the epitaxial layer provided on one of the principal surfaces of the sapphire substrate while the metallic film reflecting the light emitted from the LED is provided on the other principal surface of the sapphire substrate. The metallic film is also called a reflector layer.

In the case that the light emitting apparatus is diced using the laser beam, there is a method for peeling off the metallic film on the dicing street through another process, such as an etching treatment, before the laser dicing. In the method, unfortunately the process for the dicing increases.

FIGS. 10 and. 11 are explanatory views of the laser dicing method of the second embodiment. FIG. 10 is a plan view, and FIG. 11 is a sectional view taken on a line B-B of FIG. 10.

As illustrated in FIG. 11, for example, an epitaxial layer 52 is formed on one (backside) of the principal surfaces of the sapphire substrate 50 that is of the workpiece substrate. For example, the LED is formed in the epitaxial layer 52. A metallic film 60 constituting a reflector layer is formed on the other principal surface (irradiation surface). For example, the metallic film 60 is made of gold (Au) or aluminum (Al).

As illustrated in FIG. 10, for example, the sapphire substrate 50 is irradiated with the pulse laser beam at the identical processing point depth along the first straight line L1, the second straight line L2, and a third straight line L3, which are parallel to one another. The first irradiation, the second irradiation, and the third irradiation are the irradiation performed along the first straight line L1, the second straight line L2, and the third straight line L3, respectively. At this point, in FIG. 10, the irradiation surfaces indicated by broken lines, namely, the irradiation regions (irradiation spots) on the reflector layer surface with the laser beam are overlapped one another in both the direction of the first to third straight lines and the direction perpendicular to the first to third straight lines.

FIG. 10 illustrates the irradiation pattern in the case of the number of irradiation light pulses (P1)=3 and the number of non-irradiation light pulses (P2)=3 for each of the first irradiation to the third irradiation, namely, in the case that the irradiation is performed for three pulses while the non-irradiation is performed for three pulses. However, the second embodiment is not limited to the irradiation pattern in FIG. 10.

According to the second embodiment, the metallic film 60 can effectively be peeled off by the irradiation pattern in which the adjacent irradiation regions of the pulse laser beam are overlapped on the irradiation surface. At the same time, modified regions 54 are formed in three rows at the identical depth in the sapphire substrate 50, and the crack reaching the substrate surface is formed. Because of the crack formation, the workpiece substrate can be cleaved by the small cleaving force.

According to the second embodiment, the removal of the metallic film 60 and the crack formation in the workpiece substrate can simultaneously be performed by irradiating the workpiece substrate with the pulse laser beam. Accordingly, it is not necessary to provide the additional process of removing the metallic film, but the light emitting apparatus in which the metallic film is provided can be diced for a short time at low cost.

The embodiments are specifically described above. However, the embodiments are not limited to the specific examples. In the embodiments, the portion that is not directly necessary to describe herein is omitted in the laser dicing method and the laser dicing apparatus. However, the necessary element relating to the laser dicing method and the laser dicing apparatus can properly be selected and used.

All the laser dicing methods provided with an element of the embodiments, in which the design can properly be changed by those skilled in the art, are included in the scope of the invention. The scope of the embodiments is defined by claims and an equivalent thereof.

In the embodiments, by way of example, the sapphire substrate in which the LED is formed is described as the workpiece substrate. The embodiments described herein are suitable to the substrate, such as the sapphire substrate, which is hard, poor-cleavage, and hardly-cleaved. Alternatively, the embodiments can be applied to other workpiece substrates including glass substrates, such as the quartz glass, insulating substrates, such as the rock crystal, semiconductor substrates, such as the SiC (silicon carbide) substrate, and piezoelectric substrates.

In the embodiments, by way of example, the workpiece substrate and the pulse laser beam are relatively moved by moving the stage. Alternatively, for example, the workpiece substrate is scanned with the pulse laser beam using a laser beam scanner, and the workpiece substrate and the pulse laser beam may relatively be moved.

In the embodiments, the case in which the number of irradiation light pulses (P1)=2 and the number of non-irradiation light pulses (P2)=1 and the case in which the number of irradiation light pulses (P1)=3 and the number of non-irradiation light pulses (P2)=3 are described by way of example. However, P1 and P2 can be set to arbitrary values to obtain the optimum condition. In the embodiments, the irradiation light pulse repeats the irradiation and the non-irradiation at the pitch of the spot diameter by way of example. Alternatively, the optimum condition may be found while a pitch of the irradiation and the non-irradiation is changed by changing the pulse frequency or the stage moving speed. For example, the pitch of the irradiation and the non-irradiation may be set to 1/n or n times the spot diameter.

As to the dicing pattern, for example, plural irradiation region registers and plural non-irradiation region registers are provided, and an irradiation region register value and a non-irradiation region register value are changed in real time to desired values in desired timing, whereby various dicing patterns can be dealt with.

By way of example, the laser dicing apparatus includes the processing table unit, in which the processing table in which the dicing data is described in the number of light pulses of the pulse laser beam is stored. However, it is not always necessary to include the processing table unit. Alternatively, the laser dicing apparatus having the configuration in which the passage and the cutoff of the pulse laser beam in the pulse picker are controlled in a unit of light pulse may be used.

In order to further improve the cleavage characteristic, after the continuous crack is formed on the substrate surface, the substrate may further be irradiated with the laser beam to melt or ablate the substrate surface.

Figure 12A:
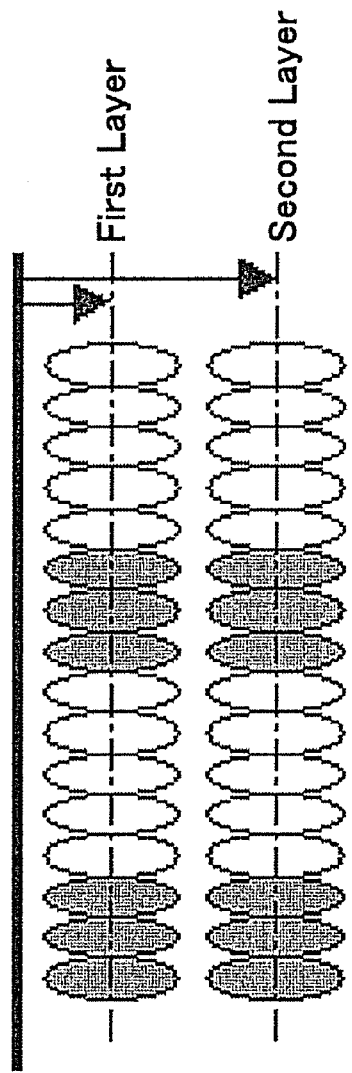
FIGS. 12A and 12B are explanatory views in the case that a crack is formed by scanning the same scanning line of a substrate plural times with pulse laser beams having different processing point depths.
Figure 12B:
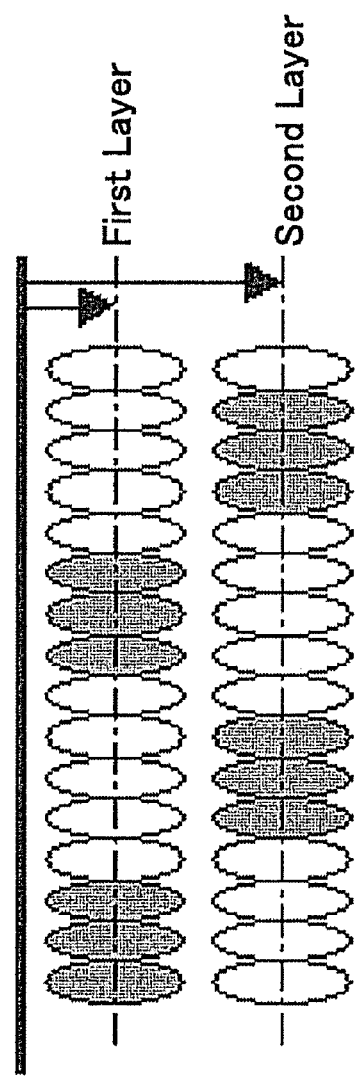

In the embodiments, the cleaving force may be reduced by repeatedly irradiating the pulse laser beams that is formed in two rows in the substantially parallel fashion in plural layers. FIGS. 12A and 12B are explanatory views in the case that a crack is formed by scanning the same scanning line of a substrate plural times with pulse laser beams having different processing point depths. FIGS. 12A and 12B are schematic diagrams of the irradiation pattern in the section of the substrate. ON (colored) indicates the irradiation, and OFF (white) indicates the non-irradiation region. FIG. 12A illustrates the case that the first scanning layer and the second scanning layer of the irradiation are in-phase (same phase), namely, the case that the irradiation pulse positions of the first scanning layer and the second scanning layer are aligned in the vertical direction. FIG. 12B illustrates the case that the first scanning layer and the second scanning layer of the irradiation are different phases, namely, the case that the irradiation pulse positions of the first scanning layer and the second scanning layer are deviated in the vertical direction.

In FIG. 12, by way of example, the first scanning layer is equal to the second scanning layer in the numbers of irradiation and non-irradiation pulses. Alternatively, the optimum condition may be found by varying the numbers of irradiation and non-irradiation pulses of the first scanning layer and the second scanning layer.

For example, desirably the accuracy of the irradiation spot position is further improved by synchronizing the stage movement with the clock signal. For example, the stage movement can be synchronized with the clock signal such that a stage moving signal S5 (FIG. 1) sent from the processing controller 26 to the XYZ-stage unit 20 is synchronized with the clock signal S1.

Two or more rows of the pulse laser beam, with which the workpiece substrate is linearly irradiated in the identical dicing street, may be provided.

EXAMPLES

Examples will be described below.

Example 1

Figure 13:
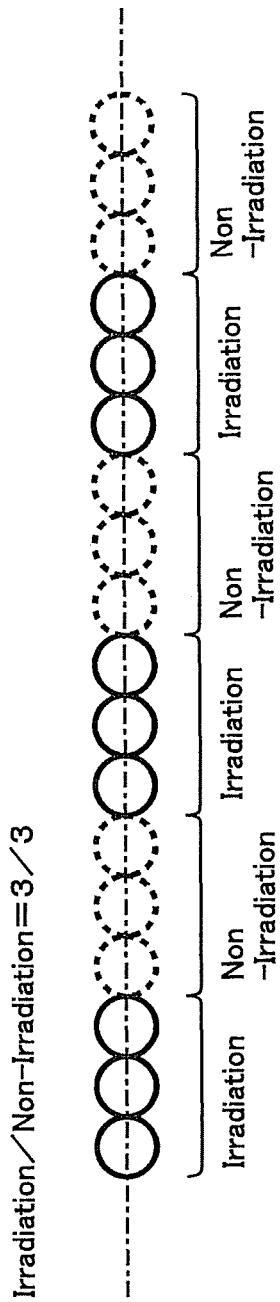
FIG. 13 is a view illustrating an irradiation pattern of Example 1.

The laser dicing was performed on the following conditions by the method of the first embodiment.
  workpiece substrate: sapphire substrate, substrate thickness of 150 μm, non-existence of epitaxial layer, non-existence of metallic film
  laser beam source: Nd:YVO$_4$ laser
  wavelength: 532 nm
  irradiation energy: 2.5 μJ/pulse
  laser frequency: 100 kHz
  the number of irradiation light pulses (P1): 3
  the number of non-irradiation light pulses (P2): 3
  the number of irradiation rows: 2
  irradiation row interval (S): 4 μm
  phase: in-phase in row direction
  pulse interval: 1.25 μm
  stage speed: 5 mm/sec
  focal position: 16 μm from workpiece substrate surface FIG. 13 is a view illustrating an irradiation pattern of Example 1. As illustrated in FIG. 13, three pulse in a unit of light pulse are set to the non-irradiation after the light-pulse irradiation is performed three times. Hereinafter the condition is described in the form of irradiation/non-irradiation=3/3. The irradiation is performed with the irradiation pattern on two straight lines that are close to each other in a parallel fashion. The irradiation is performed with the pulse laser beams that are formed in two rows parallel to each other.

Figure 14A:
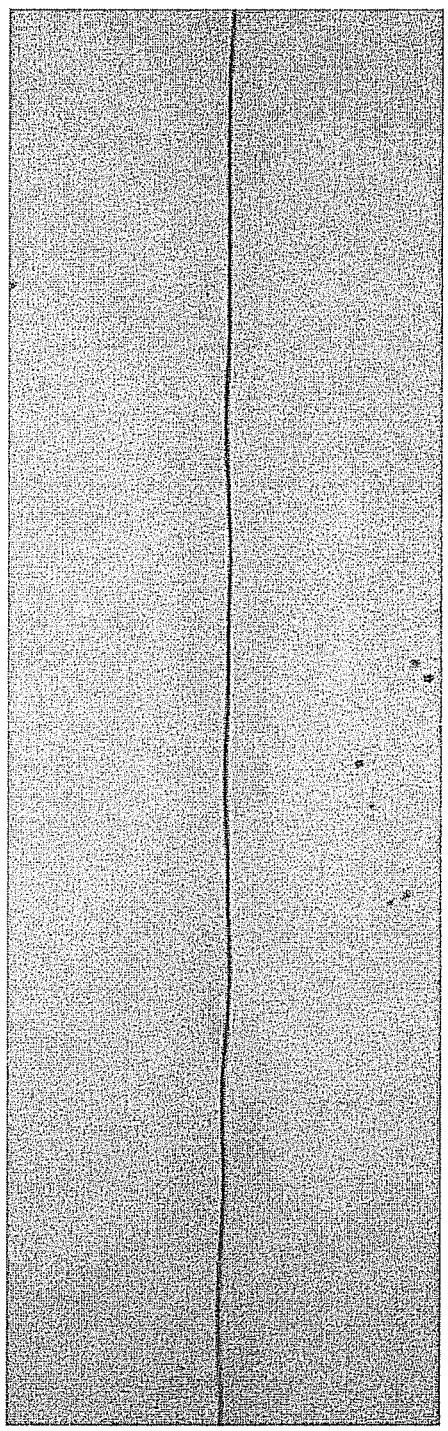
FIGS. 14A and 14B are views illustrating a laser dicing result of Example 1.
Figure 14B:
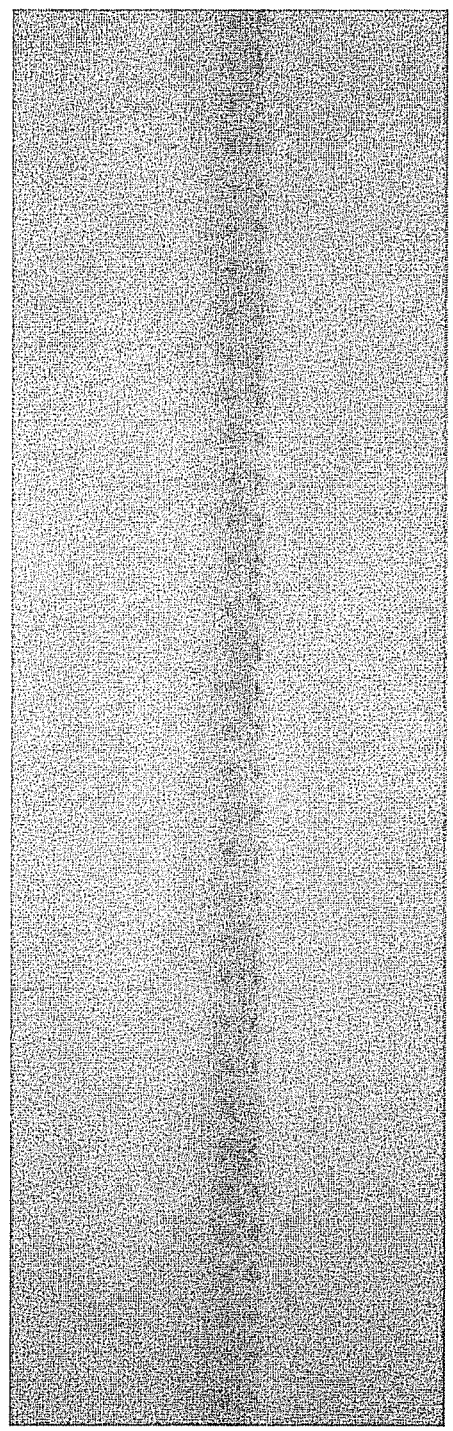
Figure 15:
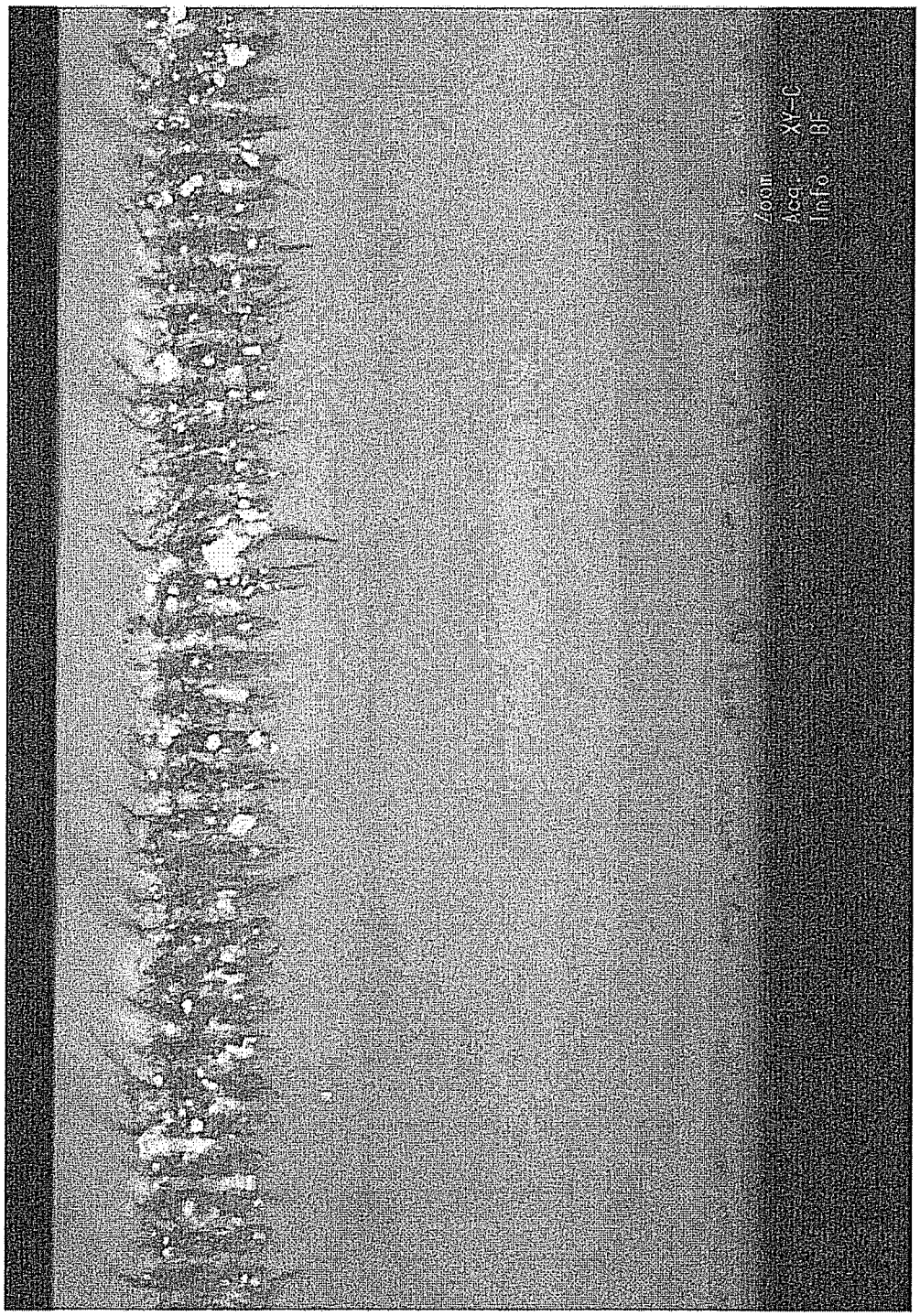
FIG. 15 is a view illustrating a laser dicing result of Example 1.

FIG. 14 illustrates the laser dicing result. FIG. 14A illustrates an optical photograph of the substrate surface, and FIG. 14B illustrates an optical photograph of the modified region. The optical photograph in FIG. 14A is taken while the crack of the substrate surface is brought into focus. The optical photograph in FIG. 14B is taken while the modified region in the substrate is brought into focus, and FIG. 15 illustrates a sectional optical photograph of the substrate parallel to the crack direction.

Figure 16:
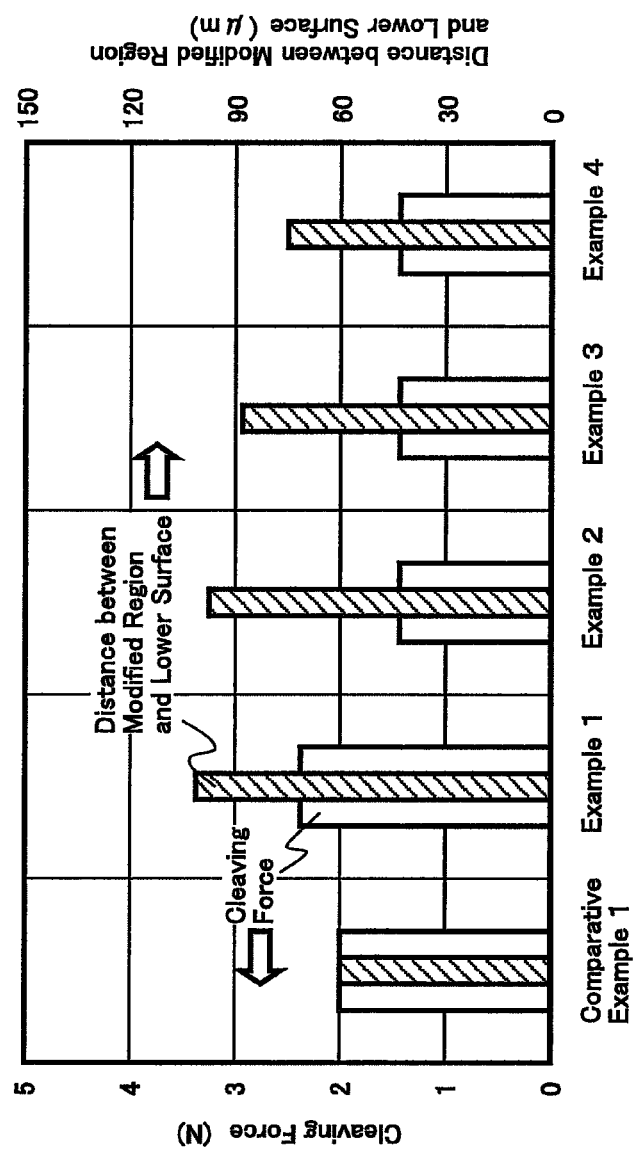
FIG. 16 is a view illustrating laser dicing results of Examples 1 to 4 and Comparative Example 1.

The workpiece substrate had a strip shapes having a width of about 5 mm, the workpiece substrate was irradiated with the pulse laser beam in a direction perpendicular to strip extending direction and a crack is formed. After the crack was formed, the cleaving force necessary for the cleavage was evaluated using the breaker. The distance (distance between modified region and lower surface) between the lower end of the modified region and the lower surface of the sapphire substrate was measured from the sectional optical photograph in FIG. 15. FIG. 16 illustrates the result. The white graph indicates the cleaving force, and the hatched graph indicates the distance between modified region and lower surface.

Example 2

The laser dicing was performed by the same method as Example 1 except that the focal position was set to 20 μm from the workpiece substrate surface. FIG. 16 illustrates the laser dicing result.

Example 3

The laser dicing was performed by the same method as Example 1 except that the focal position was set to 25 μm from the workpiece substrate surface. FIG. 16 illustrates the laser dicing result.

Example 4

The laser dicing was performed by the same method as Example 1 except that the focal position was set to 30 μm from the workpiece substrate surface. FIG. 16 illustrates the laser dicing result.

Comparative Example 1

In Comparative Example 1, the laser dicing was performed in the same method as Example 1 except that each of Examples 1 to 4 had the two irradiation rows while Comparative Example 1 had one irradiation row as illustrated in FIG. 8A and that the irradiation was performed with the pulse laser beam at two different depths on the same straight lines illustrated in FIG. 8B. The focal position was set to two layers of 14 μm and 39 μm from the workpiece substrate surface. The phase was identical in the depth direction. FIG. 16 illustrates the laser dicing result.

In both Examples 1 to 4 and Comparative Example 1, the continuous crack was able to be formed on the workpiece substrate surface.

On the conditions of Examples 1 to 4, compared with Comparative Example 1, the distance between the lower end of the modified region and the lower surface of the sapphire substrate (distance between modified region and lower surface) can be kept long, and the characteristic degradation of the element, such as the LED, caused by the laser dicing can be suppressed even if the LED is formed on the sapphire substrate. Particularly, in Examples 2 to 4, the cleaving force reduces by about 30% compared with Comparative Example 1.

Example 5

Figure 17:
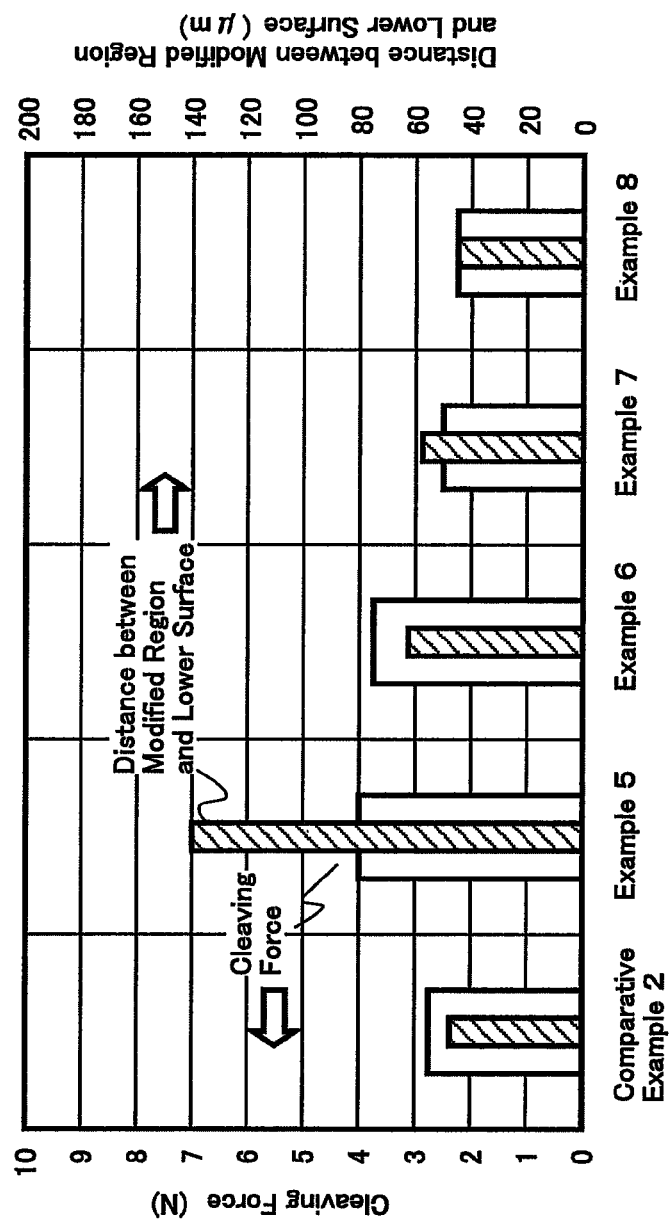
FIG. 17 is a view illustrating laser dicing results of Examples 5 to 8 and Comparative Example 2.

The laser dicing was performed on the following conditions by the method of the first embodiment.
  workpiece substrate: sapphire substrate, substrate thickness of 200 μm, non-existence of epitaxial layer, non-existence of metallic film
    laser beam source: Nd:YVO$_4$ laser
    wavelength: 532 nm
    irradiation energy: 2.5 μJ/pulse
    laser frequency: 100 kHz
    the number of irradiation light pulses (P1): 3
    the number of non-irradiation light pulses (P2): 3
    the number of irradiation rows: 2
    irradiation row interval (S): 4 μm
    phase: in-phase in row direction
    pulse interval: 1.25 μm
    stage speed: 5 mm/sec
    focal position: 25 μm from workpiece substrate surface
  Unlike Examples 1 to 4, the thickness of the sapphire substrate was set to 200 μm. The same evaluation as Examples 1 to 4 and Comparative Example 1 was performed. FIG. 17 illustrates the laser dicing result. The white graph indicates the cleaving force, and the hatched graph indicates the distance between modified region and lower surface.

Example 6

Figure 18:
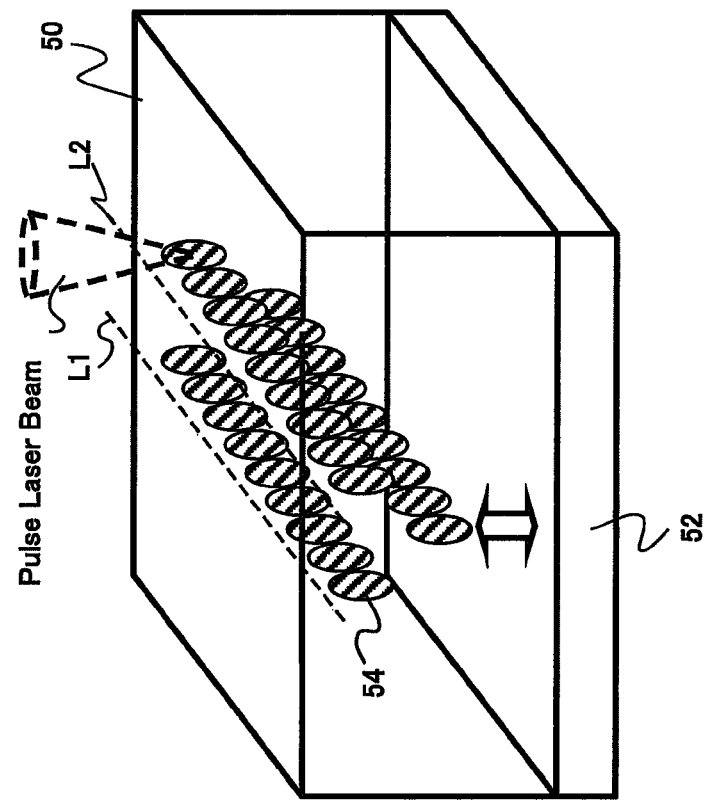
FIG. 18 is a view illustrating an irradiation pattern of Example 6.

As illustrated in FIG. 18, the laser dicing was performed by the same method as Example 5 except an irradiation pattern in which one layer is added in the depth direction between the two rows. The focal position of the added one layer was set to 65 μm from the workpiece substrate surface. The phase of the added one layer was identical to that of the upper layers in the depth direction. FIG. 17 illustrates the laser dicing result.

Example 7

The laser dicing was performed by the same method as Example 6 except that the focal position of the added one layer was set to 70 μm from the workpiece substrate surface. FIG. 17 illustrates the laser dicing result.

Example 8

The laser dicing was performed by the same method as Example 6 except that the focal position of the added one layer was set to 75 μm from the workpiece substrate surface. FIG. 17 illustrates the laser dicing result.

Comparative Example 2

The laser dicing was performed by the same method as Example 5 except that only one row was irradiated with the pulse laser beam on the same straight line at three different depths. The focal position was set to three layers of 14 μm, 49 μm, and 74 μm from the workpiece substrate surface. The phase was identical in the depth direction. FIG. 17 illustrates the laser dicing result.

In both Examples 5 to 8 and Comparative Example 2, the Continuous crack was able to be formed on the workpiece substrate surface.

On the conditions of Examples 5 to 7, compared with Comparative Example 2, the distance between the lower end of the modified region and the lower surface of the sapphire substrate (distance between modified region and lower surface) can be kept long, and the characteristic degradation of the element, caused by the laser dicing can be suppressed even if the LED is formed on the sapphire substrate. In Examples 7 and 8, the cleaving force reduces compared with Comparative Example 2. Particularly, in Example 7, compared with Comparative Example 2, the distance between modified region and lower surface is kept long, and the cleaving force can reduce.

Example 9

Figure 19:
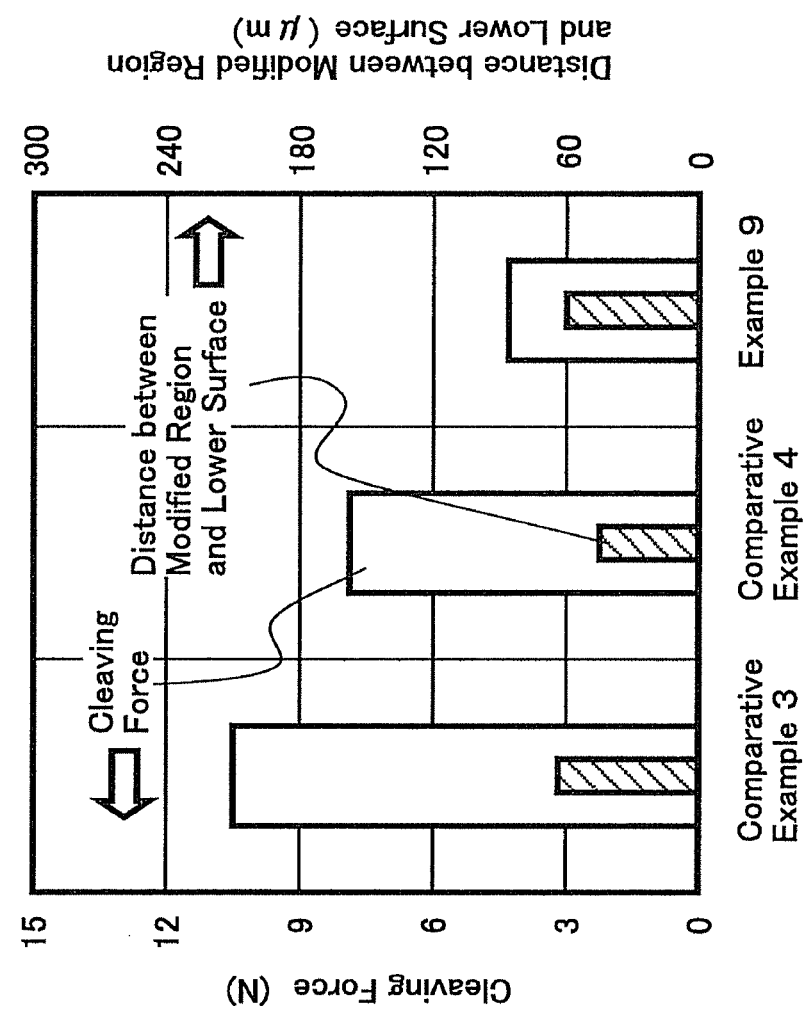
FIG. 19 is a view illustrating laser dicing results of Example 9 and Comparative Examples 3 and 4.

The laser dicing was performed on the following conditions by the method of the first embodiment.
  workpiece substrate: sapphire substrate, substrate thickness of 300 μm, non-existence of epitaxial layer, non-existence of metallic film
    laser beam source: Nd:YVO$_4$ laser
    wavelength: 532 nm
    irradiation energy: 2.5 μJ/pulse
    laser frequency: 100 kHz
    the number of irradiation light pulses (P1): 3
    the number of non-irradiation light pulses (P2): 3
    the number of irradiation rows: 2
    irradiation row interval (S): 4 μm
    the number of layers in depth direction: 3
    phase: in-phase in both row direction and depth direction
    pulse interval: 1.25 μm
    stage speed: 5 mm/sec
    focal position: 25 μm, 70 μm, and 125 μm from workpiece substrate surface
  Unlike Examples 1 to 4 and 5 to 8, the thickness of the sapphire substrate was set to 300 μm. The number of layers in the depth direction was set to 3. The same evaluation as Examples 1 to 4 and Comparative Example 1 was performed. FIG. 19 illustrates the laser dicing result. The white graph indicates the cleaving force, and the hatched graph indicates the distance between modified region and lower surface.

Comparative Example 3

The laser dicing was performed by the same method as Example 9 except that only one row was irradiated with the pulse laser beam on the same straight line at four different depths. The focal position was set to four layers of 14 μm, 49 μm, 84 μm, and 119 μm from the workpiece substrate surface. The phase was identical in the depth direction. FIG. 19 illustrates the laser dicing result.

Comparative Example 4

The laser dicing was performed by the same method as Example 9 except that only one row was irradiated with the pulse laser beam on the same straight line at five different depths. The focal position was set to five layers of 14 μm, 44 μm, 74 μm, 104 μm, and 134 μm from the workpiece substrate surface. The phase was identical in the depth direction. FIG. 19 illustrates the laser dicing result.

In both Example 9 and Comparative Examples 3 and 4, the continuous crack was able to be formed on the workpiece substrate surface.

On the conditions of Example 9, compared with Comparative Example 3, the distance between the lower end of the modified region and the lower surface of the sapphire substrate (distance between modified region and lower surface) can be kept long, and the characteristic degradation of the element, caused by the laser dicing can be suppressed even if the LED is formed on the sapphire substrate. In Example 9, the cleaving force reduces compared with Comparative Examples 3 and 4. Accordingly, compared with Comparative Example 4, the distance between modified region and lower surface is long, and the cleaving force can reduce.

Example 10

The laser dicing was performed on the following by the method of the second embodiment.
workpiece substrate: sapphire substrate, substrate thickness of 150 µm, existence of epitaxial layer, existence of metallic film
    laser beam source: Nd:YVO$_4$ laser
    wavelength: 532 nm
    irradiation energy: 3.0 µJ/pulse
    laser frequency: 100 kHz
    the number of irradiation light pulses (P1): 3
    the number of non-irradiation light pulses (P2): 3
    the number of irradiation rows: 2
    irradiation row interval (S): 4 µm
    phase: in-phase in row direction
    pulse interval: 1.25 µm
    stage speed: 5 mm/sec
    focal position: 18 µm from workpiece substrate surface
The sapphire substrate with the metallic film was used as the workpiece substrate to perform the dicing.

Figure 20:
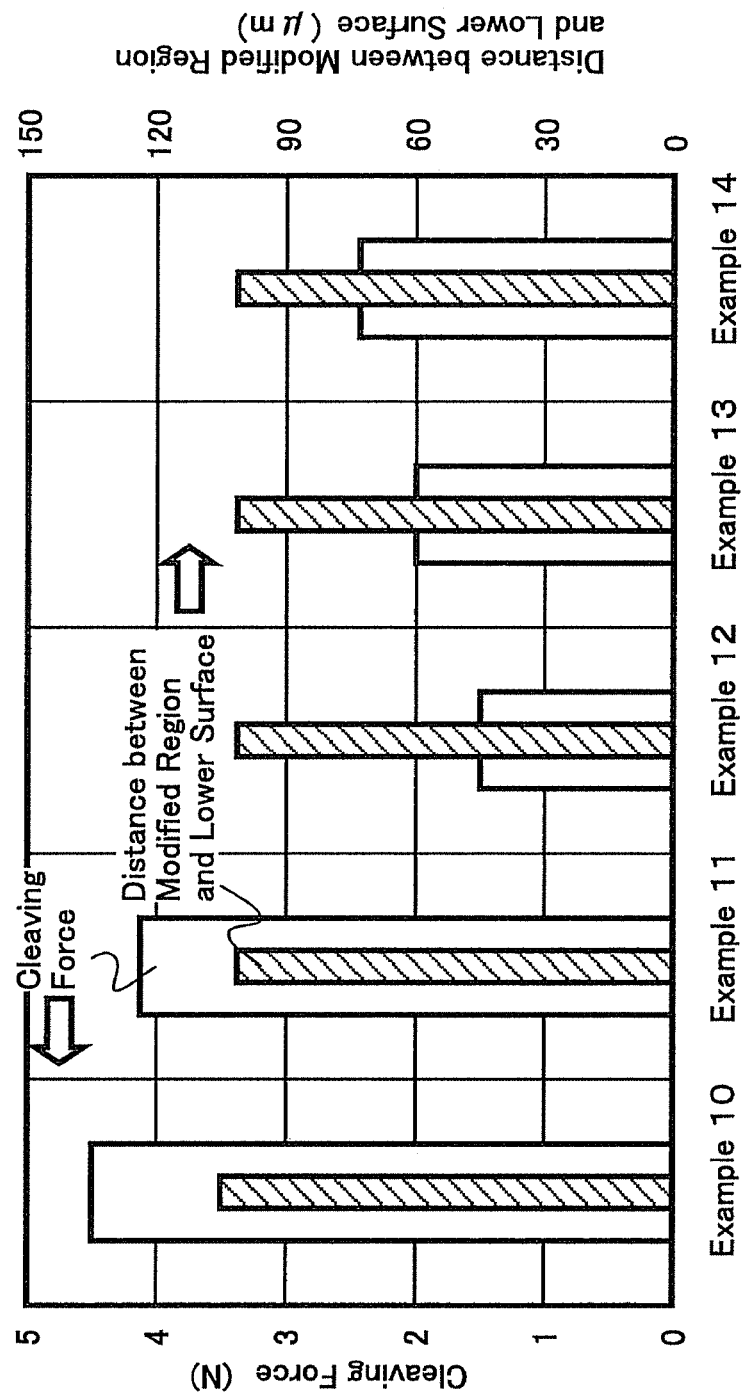
FIG. 20 is a view illustrating laser dicing results of Examples 10 to 14.

The workpiece substrate had a strip shapes having a width of about 5 mm, the workpiece substrate was irradiated with the pulse laser beam in the direction perpendicular to strip extending direction and a crack is formed. After the crack was formed, the cleaving force necessary for the cleavage was evaluated using the breaker. The distance from the lower end of the modified region to the lower surface of the sapphire substrate distance between modified region and lower surface) was measured from the sectional optical photograph. FIG. 20 illustrates the result. The white graph indicates the cleaving force, and the hatched graph indicates the distance between modified region and lower surface.

FIGS. 21A to 21E illustrate optical photographs of the metallic-film removing results by the laser dicing. FIG. 21A corresponds to Example 10.

Example 11

The laser dicing was performed by the same method as Example 1 except that the focal position was set to 20 µm from the workpiece substrate surface. FIGS. 20 and 21B illustrate the laser dicing results.

Example 12

The laser dicing was performed by the same method as Example 11 except that the number of irradiation rows was set to three. FIGS. 20 and 21C illustrate the laser dicing results.

Example 13

The laser dicing was performed by the same method as Example 12 except that two rows are overlapped, namely, two rows were irradiated at a row interval of 0 and that one row was further irradiated at an interval of 4 µm with respect to the overlapped two rows. FIGS. 20 and 21D illustrate the laser dicing results.

Example 14

The laser dicing was performed by the same method as Example 12 except that the row interval was set to 2 µm. FIGS. 20 and 21E illustrate the laser dicing results.

The continuous crack was able to be formed on the workpiece substrate surface in Examples 10 to 14. As illustrated in FIGS. 21A to 21E, the metallic film was able to be removed at the same time as the crack formation in Examples 10 to 14. Particularly, on the conditions of Examples 12 to 14, the metallic film was removed well with a small amount of residual.

The smallest cleaving force was obtained on the condition of Example 12.

What is claimed is:

1. A laser dicing method comprising:
    placing a workpiece substrate on a stage, the workplace substrate comprising a surface facing away from the stage;
    generating a clock signal;
    emitting a pulse laser beam synchronous with the clock signal, the pulse laser beam having a wavelength that enables the pulse laser beam to pass through the workpiece substrate;
    moving relatively the workpiece substrate and the pulse laser beam;
    switching irradiation and non-irradiation of the workpiece substrate with the pulse laser beam in a unit of light pulse in synchronization with the clock signal to perform first irradiation of the pulse laser beam on a first straight line by controlling passage and cutoff of the pulse laser beam using a pulse picker, the pulse laser beam being irradiated in a direction substantially perpendicular to the surface of the substrate in the first irradiation;
    switching the irradiation and non-irradiation of the workpiece substrate with the pulse laser beam in a unit of light pulse in synchronization with the clock signal to perform second irradiation of the pulse laser beam on a second straight line, the second straight line being adjacent and substantially parallel to the first straight line, by controlling the passage and cutoff of the pulse laser beam using the pulse picker after the first irradiation, the pulse laser beam being irradiated in a direction substantially perpendicular to the surface of the substrate in the second irradiation; and
    forming a crack reaching the workpiece substrate surface on the workpiece substrate by the first irradiation and the second irradiation,
    wherein the crack is continuously formed on the workpiece substrate surface by controlling irradiation energy of the pulse laser beam, a processing point depth of the pulse laser beam, and lengths of an irradiation region and a non-irradiation region of the pulse laser beam.

2. The laser dicing method according to claim 1, wherein the second irradiation is performed at a processing point depth identical to that of the first irradiation.

3. The laser dicing method according to claim 1, wherein an interval between the first and second straight lines, the irradiation energy of the pulse laser beam, the processing point depth of the pulse laser beam, and the lengths of the irradiation region and the non-irradiation region of the pulse laser beam are controlled such that an external force necessary to cleave the workpiece substrate is substantially minimized after the crack formation.

4. The laser dicing method according to claim 1, wherein a pattern of irradiation and non-irradiation of the pulse laser beam in the second irradiation has a relationship in which a pattern of irradiation and non-irradiation of the pulse laser beam in the first irradiation is parallelly translated in a direction perpendicular to the first straight line.

5. The laser dicing method according to claim 1, wherein $3.2 \leq S/d \leq 4.8$ holds, where S is an interval between the first straight line and the second straight line, and d is a theoretical beam diameter in a focal position of the pulse laser beam.

6. The laser dicing method according to claim 1, wherein the workpiece substrate is a sapphire substrate.

7. The laser dicing method according to claim 1, wherein a light emitting element is formed on one of principal surfaces of the workpiece substrate, and the workpiece substrate is irradiated from the other principal surface.

8. The laser dicing method according to claim 7, wherein a metallic film is formed on the other principal surface, and the metallic film is removed by the first irradiation and the second irradiation.

9. A laser dicing method comprising:
placing a workpiece substrate on a stage, the workplace substrate comprising a surface facing away from the stage;
generating a clock signal;
emitting a pulse laser beam synchronous with the clock signal, the pulse laser beam having a wavelength that enables the pulse laser beam to pass through the workpiece substrate;
moving relatively the workpiece substrate and the pulse laser beam;
switching irradiation and non-irradiation of the workpiece substrate with the pulse laser beam in a unit of light pulse in synchronization with the clock signal to perform first irradiation of the pulse laser beam on a first straight line by controlling passage and cutoff of the pulse laser beam using a pulse picker, the pulse laser beam being irradiated in a direction substantially perpendicular to the surface of the substrate in the first irradiation;
switching the irradiation and non-irradiation of the workpiece substrate with the pulse laser beam in a unit of light pulse in synchronization with the clock signal to perform second irradiation of the pulse laser beam at the processing point depth identical to that of the first irradiation on a second straight line, the second straight line being adjacent and substantially parallel to the first straight line, by controlling the passage and cutoff of the pulse laser beam using the pulse picker after the first irradiation, the pulse laser beam being irradiated in a direction substantially perpendicular to the surface of the substrate in the second irradiation;
switching the irradiation and non-irradiation of the workpiece substrate with the pulse laser beam in a unit of light pulse in synchronization with the clock signal to perform third irradiation of the pulse laser beam at the processing point depth different from that of the first irradiation on a third straight line, the third straight line being identical or substantially parallel to the first straight line, by controlling the passage and cutoff of the pulse laser beam using the pulse picker after the second irradiation, the pulse laser beam being irradiated in a direction substantially perpendicular to the surface of the substrate in the third irradiation;
switching the irradiation and non-irradiation of the workpiece substrate with the pulse laser beam in a unit of light pulse in synchronization with the clock signal to perform fourth irradiation of the pulse laser beam at the processing point depth identical to that of the third irradiation on a fourth straight line, the fourth straight line being adjacent and substantially parallel to the third straight line, by controlling the passage and cutoff of the pulse laser beam using the pulse picker after the third irradiation, the pulse laser beam being irradiated in a direction substantially perpendicular to the surface of the substrate in the fourth irradiation; and
forming a crack reaching the workpiece substrate surface on the workpiece substrate by the first irradiation, the second irradiation, the third irradiation, and the fourth irradiation,
wherein the crack is continuously formed on the workpiece substrate surface by controlling irradiation energy of the pulse laser beam, a processing point depth of the pulse laser beam, and lengths of an irradiation region and a non-irradiation region of the pulse laser beam.

* * * * *